(12) United States Patent
Soltani et al.

(10) Patent No.: US 12,438,751 B2
(45) Date of Patent: Oct. 7, 2025

(54) DEMODULATION REFERENCE SIGNAL SEQUENCE SIGNALING FOR SINGLE CARRIER WAVEFORMS WITH A NONLINEAR POWER AMPLIFY IN HIGHER BANDS

(71) Applicant: QUALCOMM Incorporated, San Diego, CA (US)

(72) Inventors: Morteza Soltani, San Diego, CA (US); Jun Ma, San Diego, CA (US); Xiaoxia Zhang, San Diego, CA (US); Jing Sun, San Diego, CA (US); Raviteja Patchava, San Diego, CA (US); Zhifei Fan, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 444 days.

(21) Appl. No.: 17/934,106

(22) Filed: Sep. 21, 2022

(65) Prior Publication Data

US 2024/0097944 A1 Mar. 21, 2024

(51) Int. Cl.
*H04L 25/02* (2006.01)
*H04L 5/00* (2006.01)

(52) U.S. Cl.
CPC ........ *H04L 25/0228* (2013.01); *H04L 5/0051* (2013.01)

(58) Field of Classification Search
None
See application file for complete search history.

(56) References Cited

U.S. PATENT DOCUMENTS

| | | | | |
|---|---|---|---|---|
| 2016/0087774 | A1* | 3/2016 | Guo | ...................... H04L 5/0051 370/329 |
| 2021/0044981 | A1* | 2/2021 | Bhattad | .................. H04J 13/18 |
| 2023/0216604 | A1* | 7/2023 | Yu | ........................ H04W 72/232 370/329 |
| 2023/0262714 | A1* | 8/2023 | Kim | .................. H04W 72/0453 370/329 |
| 2023/0396385 | A1* | 12/2023 | Kwak | ................... H04L 5/0094 |

* cited by examiner

*Primary Examiner* — Luna Weissberger
(74) *Attorney, Agent, or Firm* — QUALCOMM Incorporated

(57) ABSTRACT

An apparatus may be configured to transmit (or receive) an indication of a first DMRS, where the first DMRS is identified based on at least two of a non-linearity of a power amplifier of the first device, a modulation and coding scheme (MCS) used for a data transmission associated with the first DMRS, or a channel type of a channel associated with the first DMRS; transmit (or receive), for a second device (or from a first device), the first DMRS for channel estimation at the second device; and transmit (or receive) the data transmission associated with the first DMRS.

26 Claims, 12 Drawing Sheets

DEMODULATION REFERENCE SIGNAL SEQUENCE SIGNALING FOR SINGLE CARRIER WAVEFORMS WITH A NONLINEAR POWER AMPLIFY IN HIGHER BANDS

TECHNICAL FIELD

The present disclosure relates generally to communication systems, and more particularly, to a demodulation reference signal (DMRS) configuration for an associated data transmission.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be configured to transmit an indication of a first DMRS, where the first DMRS is identified based on at least two of a non-linearity of a power amplifier of the first device, a modulation and coding scheme (MCS) used for a data transmission associated with the first DMRS, or a channel type of a channel associated with the first DMRS. The apparatus may also be configured to transmit, for a second device, the first DMRS for channel estimation at the second device.

In an aspect of the disclosure, a method, a computer-readable medium, and an apparatus are provided. The apparatus may be configured to receive an indication of a first DMRS associated with a first device, where the first DMRS is identified based on at least two of a non-linearity of a power amplifier of the first device, a MCS used for a data transmission associated with the first DMRS, or a channel type of a channel associated with the first DMRS. The apparatus may also be configured to receive, from the first device, the first DMRS for channel estimation. The apparatus may also be configured to receive the data transmission associated with the first DMRS.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
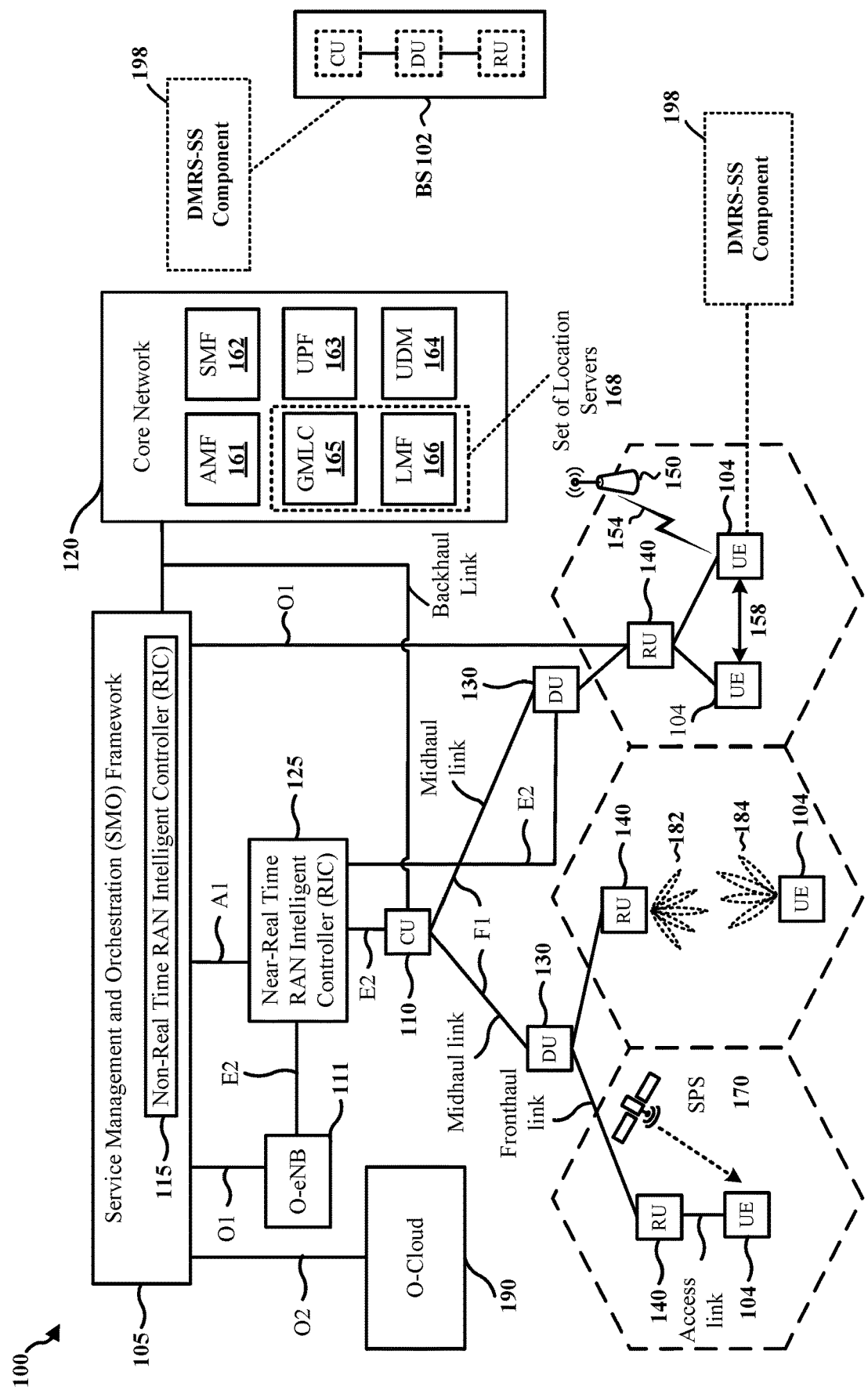
FIG. 1 is a diagram illustrating an example of a wireless communications system and an access network.

In some aspects of wireless communications, PA and/or a power amplifier may be used to increase the power of signals (e.g., to improve the quality of transmissions). In some aspects, power amplifiers produce nonlinear distortions due to a saturation property. The power amplifier nonlinear distortion, in some aspects, leads to interference both in the frequency band of transmitted signal (in-band) and in the adjacent frequency bands (out-of-band). The in-band interference caused by nonlinear PA, in some aspects, may degrade the reception performance, while the out-of-band interference may harm the communication systems operating in the adjacent frequency channels. In order not to severely interfere with communication systems operating in the adjacent channels, a transmit spectrum mask may be adopted. To reduce the effects of nonlinear distortion both in-band and out-of-band, a power amplifier should operate in, or close to, a linear region, e.g., the region which is not close to the PA saturation point. In order to operate in, or close to, the linear region the power amplifier may employ a PA backoff (e.g., a reduction in input power to decrease the difference between the ideal (linear) and the actual (saturated) output power). A larger PA backoff, in some aspects, may reduce the transmit power, resulting in reduced PA efficiency and potentially lead to performance degradation for the amplified signal.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 902.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured with a DMRS sequence signaling (DMRS-SS) component 198 is configured to transmit an indication of a first DMRS and transmit, for a second device, the first DMRS for channel estimation at the second device. The DMRS-SS component 198 may be configured to receive an indication of a first DMRS associated with a first device; receive, from the first device, the first DMRS for channel estimation; and receive the data transmission associated with the first DMRS. Although the following description may be focused on 5G NR, the concepts described herein may be applicable to other similar areas, such as LTE, LTE-A, CDMA, GSM, and other wireless technologies.

Figure 2:
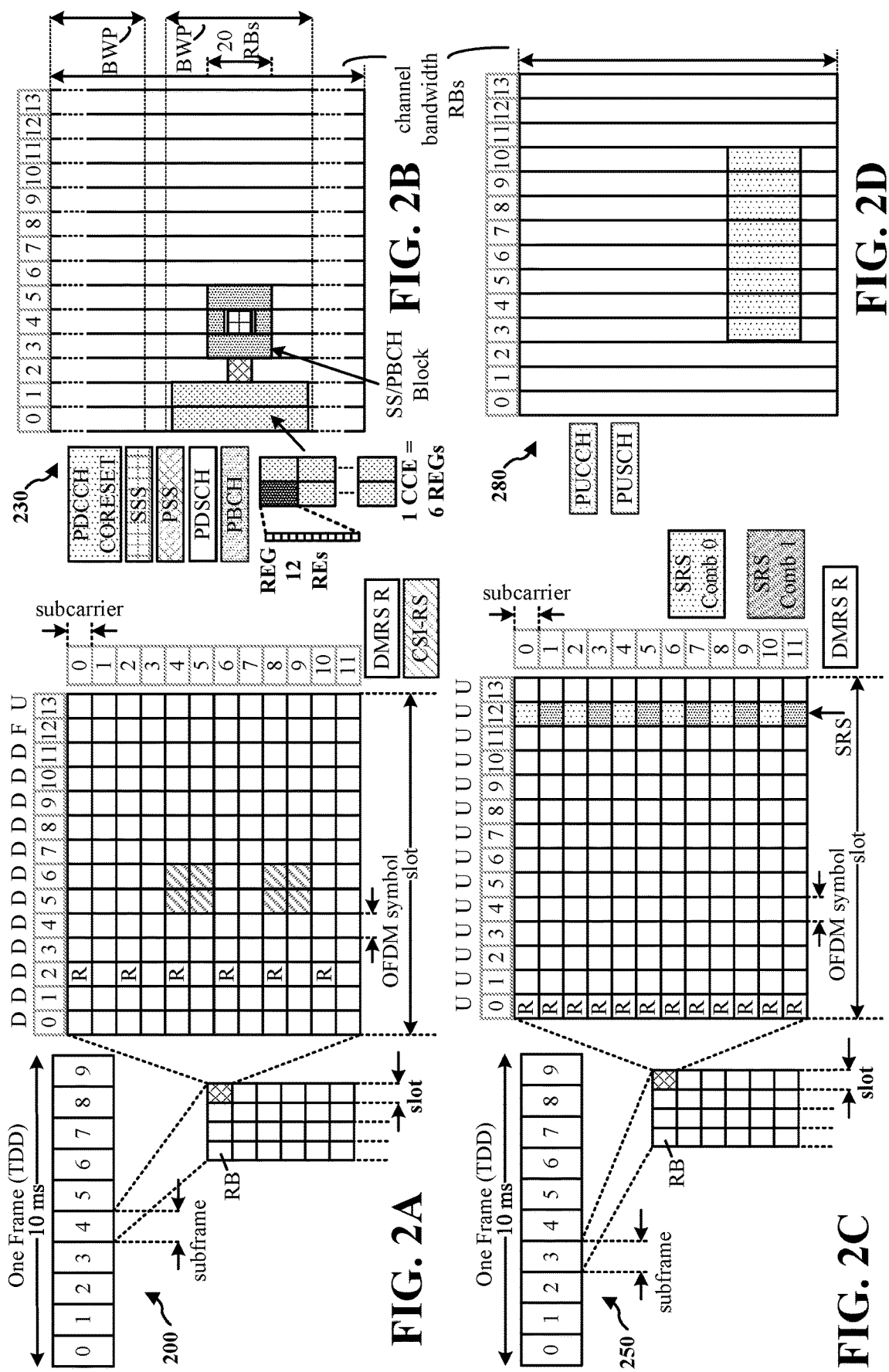
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 1060 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
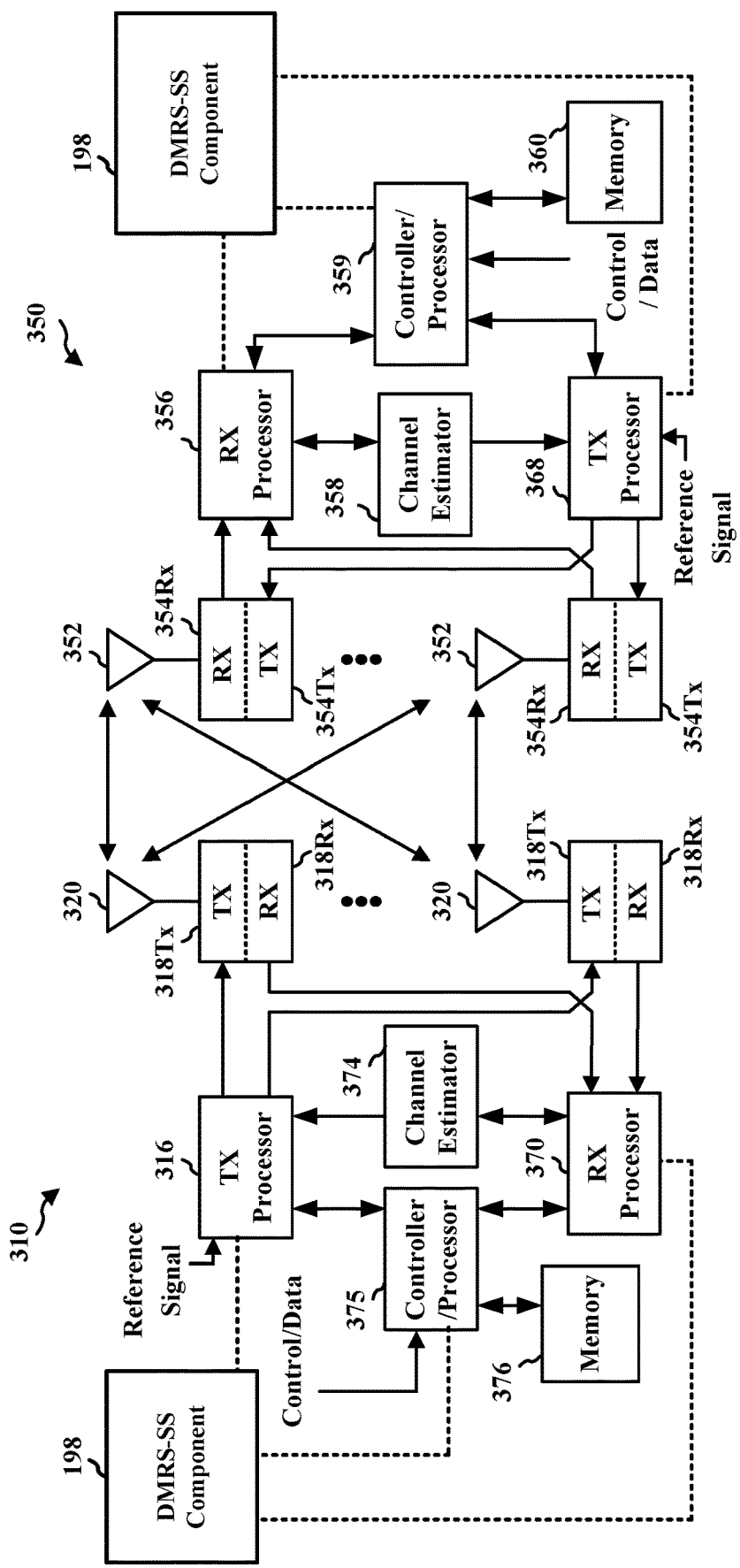
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/ processor 375 is also responsible for error detection using an ACK and/or NACK protocol to support HARQ operations.

At least one of the TX processor 368, the RX processor 356, and the controller/processor 359 may be configured to perform aspects in connection with the DMRS-SS component 198 of FIG. 1.

At least one of the TX processor 316, the RX processor 370, and the controller/processor 375 may be configured to perform aspects in connection with the DMRS-SS component 198 of FIG. 1.

In some aspects of wireless communications, PA and/or a power amplifier may be used to increase the power of signals (e.g., to improve the quality of transmissions). In some aspects, power amplifiers produce nonlinear distortions due to a saturation property. The PA nonlinear distortion, in some aspects, leads to interference both in the frequency band of transmitted signal (in-band) (e.g., increasing an error vector magnitude (EVM) at the receiving device) and in the adjacent frequency bands (out-of-band). The in-band interference caused by nonlinear PA, in some aspects, may degrade the reception performance, while the out-of-band interference may harm the communication systems operating in the adjacent frequency channels. In order not to severely interfere with communication systems operating in the adjacent channels, a transmit spectrum mask may be adopted. To reduce the effects of nonlinear distortion both in-band and out-of-band, a power amplifier should operate in, or close to, a linear region, e.g., the region which is not close to the PA saturation point. In order to operate in, or close to, the linear region the power amplifier may employ a PA backoff (e.g., a reduction in input power to decrease the difference between the ideal (linear) and the actual (saturated) output power). A larger PA backoff, in some aspects, may reduce the transmit power, resulting in reduced power amplifier efficiency and potentially lead to performance degradation for the amplified signal.

In some aspects of wireless communication, OFDM-based waveforms may be utilized for higher bands (FR4 and beyond) as they are backward compatible with FR1/FR2/FR2x waveform choice. Additionally, in scenarios where energy efficiency standards and/or thresholds are more relaxed, OFDM-based waveforms offer high spectral efficiency. A single carrier (SC) waveform (e.g., having a lower PAPR compared to a OFDM-based waveform) may be used in some scenarios with high energy efficiency standards and/or thresholds. In some aspects, a lower peak-to-average power ratio (PAPR) may lead to higher PA efficiency and extended battery life. For example, a power amplifier may be more efficient at higher input/output powers associated with a smaller PA backoff that may be used for transmissions with a lower PAPR (e.g., transmissions that experience less negative effects of PA nonlinearity at a same average power as a transmission with a higher PAPR). SC waveforms may also achieve a high data rate due to massive spectrum availability.

In some aspects, to facilitate frequency domain equalization, a CP may be introduced to create OFDM-like blocks or symbols. Guard interval (GI), sometimes referred to as unique word (UW), may be considered as a special case of CP in this context. Both waveforms will probably be included for higher bands. In some aspects, slot-level (or symbol-level) alignment between OFDM and SC waveforms may be desired. Additionally, in some aspects, it may be beneficial to use common numerology to afford a uniform transceiver design (e.g., relating to sampling rates and/or FFT sizes).

In some aspects of wireless communication, e.g., 5G NR, DMRS sequences may be used for channel estimation purposes. The choice of DMRS sequence depends on various factors, e.g., PAPR, good autocorrelation and cross correlation properties, and/or other signal or channel characteristics. For a UL DFT-s-OFDM waveform, in some aspects, a Zadoff-Chu (ZC) sequence may be used in PUCCH and PUSCH across all MCSs (including π/2 BPSK). In some aspects, ZC sequences may be used in PUSCH and PUCCH for MCSs not including π/2 BPSK, where for π/2 BPSK-modulated PUCCH and PUSCH, a π/2 BPSK DMRS is used. In some aspects, the use of the π/2 BPSK DMRS is based on a ZC DMRS having ~1.6 dB higher PAPR than π/2 BPSK-modulated data. A DMRS sequence having a higher PAPR (e.g., a ZC DMRS) may be affected by the nonlinear PA more severely compared to a data transmission having a lower PAPR (e.g., π/2 BPSK-modulated data). Accordingly, using the example of a ZC DMRS sequence and π/2 BPSK-modulated data, the ZC DMRS sequence experiences a different combined effective wireless channel than π/2 BPSK modulated data. Similar differences in combined effective wireless channel may be experience for other MCSs as well (e.g., for QPSK, 16-QAM, 64-QAM, etc.). A receiving device using the DMRS sequence having a higher PAPR for channel estimation may be systematically inaccurate as to the effect of the PA nonlinearity on the transmission of data having a lower PAPR from the transmitting device (e.g., may overestimate the effect of the PA non-linearity on the lower-PAPR data transmission). The disclosure presents a method and apparatus for determining a suitable (or optimized) DMRS sequence and/or PA backoff based on a number of factors including a MCS used for an associated data transmission, a PA non-linearity at a transmitting device, a numerology, a channel type associated with the DMRS and/or the data transmission, a threshold bit error rate (BER), and/or a threshold block error rate (BLER). The disclosure further presents a method and or apparatus for signaling the determined DMRS. The determined DMRS, in some aspects, may be an optimized DMRS, wherein the optimized DMRS is a DMRS selected from a set of candidate DMRSs as a DMRS best suited for an associated communication or apparatus based on one or more characteristics of the optimized DMRS and the associated communication.

Figure 4:
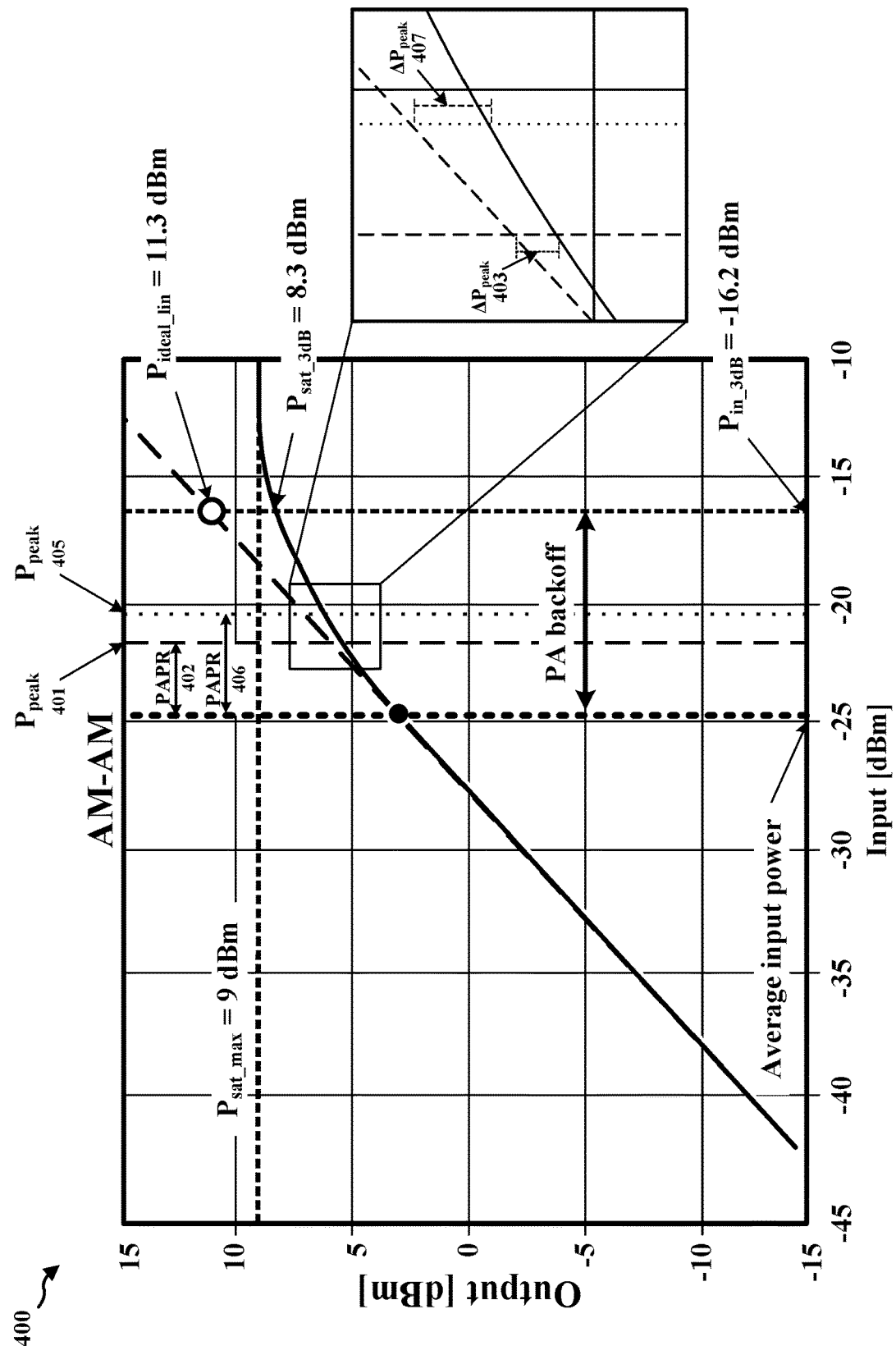
FIG. 4 is a diagram illustrating an effect of power amplification (PA) nonlinearity on signals with different peak-to-average power ratios (PAPRs) using a same PA backoff in accordance with different aspects of the disclosure.

FIG. 4 is a diagram 400 illustrating an effect of PA nonlinearity on signals with different PAPRs using a same PA backoff in accordance with different aspects of the disclosure. Diagram 400 illustrates an output power of a power amplifier based on an input power to the power amplifier. Assuming a same average input power for a first and second transmitted signal (e.g., DMRS sequence or data transmission), a first transmission may have a peak power ($P_{peak}$) 401 associated with a PAPR 402 while a second transmission may have a peak power ($P_{peak}$) 405 associated with a PAPR 406. The lower peak power 401 may be associated with a smaller difference from a linear PA ($\Delta P_{peak}$) 403 than a difference from a linear PA ($\Delta P_{peak}$) 407 associated with the higher peak power 405.

Figure 5:
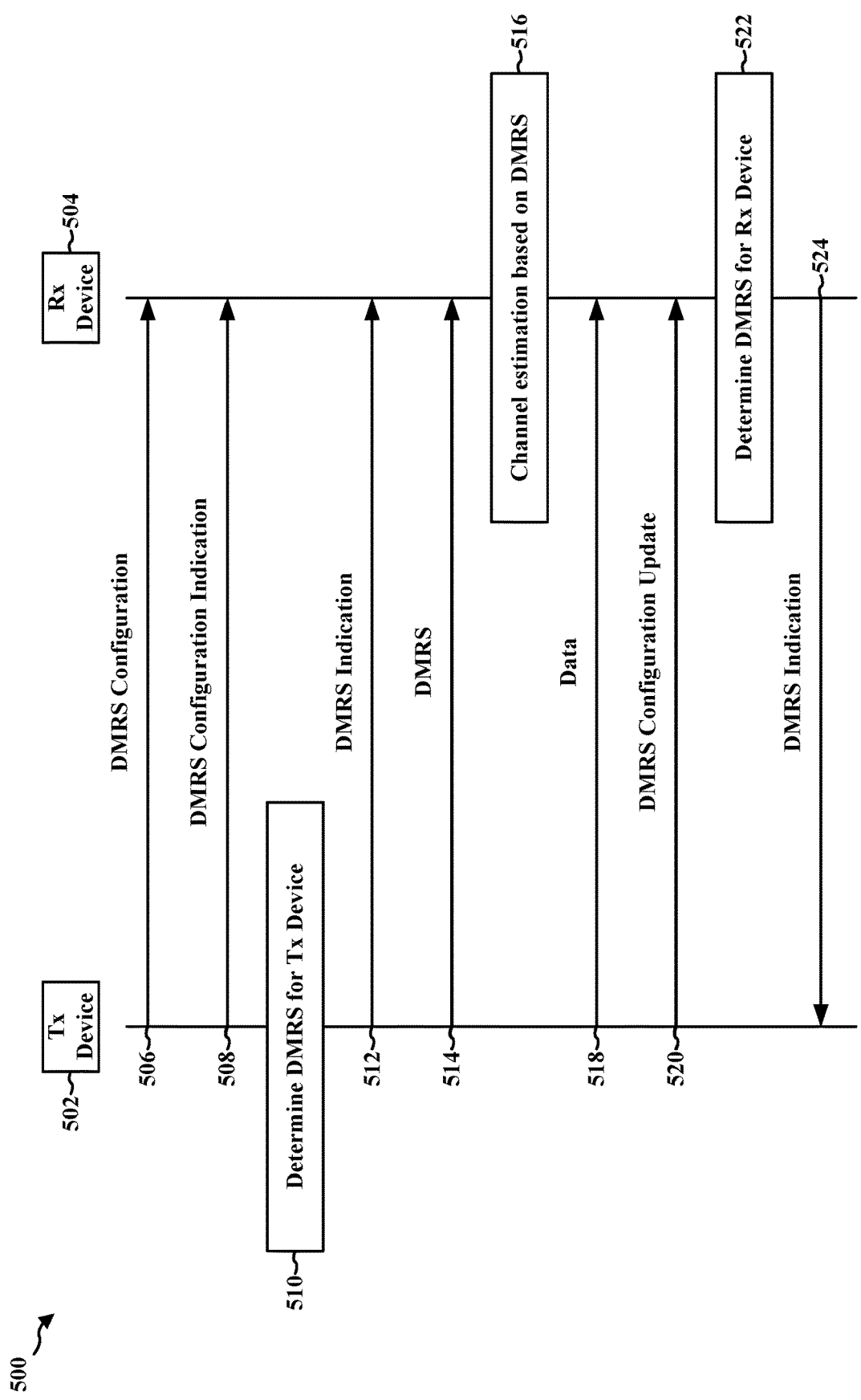
FIG. 5 is a call flow diagram illustrating a wireless communication in accordance with some aspects of the disclosure.

FIG. 5 is a call flow diagram 500 illustrating a wireless communication in accordance with some aspects of the disclosure. The wireless communication may be between a first wireless device (e.g., a UE) and second wireless device or between the first wireless device and a network node (e.g., a base station) with either of the participants being the Tx device 502 or the Rx device 504 depending on the nature of the wireless communication (e.g., UL vs. DL). A Tx device 502 may transmit, and a Rx device 504 may receive, a DMRS configuration 506. The DMRS configuration, in some aspects, may include one or more indexed lists of candidate DMRS that may be activated or indicated for use. In some aspects, the DMRS configuration may indicate a mapping between a set of more than two MCSs and a set of more than two DMRSs. Each MCS in the set of more than two MCSs, in some aspects, may be mapped to one DMRS in the set of more than two DMRSs.

In some aspects, the DMRS configuration 506 may include a plurality of mappings between a set of more than two MCSs and a set of more than two DMRSs. Each mapping in the plurality of mappings, in some aspects, may include a mapping of each MCS in the set of more than two MCSs to one DMRS in the set of more than two DMRSs. In some aspects, the DMRS configuration may be based on a set of characteristics of the Rx device 504. The DMRS configuration 506, in some aspects, may include a default DMRS to be used in the absence of a contrary indication (e.g., an indication of a different DMRS). The mappings, in some aspects, may map groups of one or more of the characteristics on which the DMRS may be determined to a corresponding DMRS sequence (or set of DMRS parameters). For example, in some aspects, different combinations of an indicated MCS used for an associated data transmission, a PA non-linearity at the Tx device 502, a numerology, a channel type associated with the DMRS and/or the data transmission, a threshold BER, and/or a threshold BLER may be mapped to different DMRS sequences. The DMRS configuration 506, in some aspects, may be transmitted via RRC signaling.

The Tx device 502 may transmit, and the Rx device 504 may receive, a DMRS configuration indication 508. The DMRS configuration indication 508 may include an indication of a particular mapping in the plurality of mappings to use to identify an DMRS. The DMRS configuration indication 508 m, in some aspects, may be transmitted via a MAC-CE or via control information (e.g., DCI, sidelink control information (SCI), or UCI). In some aspects, the particular mapping may be based on a capability of the Rx device 504, such that the DMRS configuration indication 508 is not transmitted and the Rx device 504 determines which of the plurality of mappings to use (or activate) based on the capabilities of the Rx device 504. Based on one or more of MCS used for an associated data transmission, a PA non-linearity at the Tx device 502, a power consumption threshold, a numerology, a channel type associated with the DMRS and/or the data transmission, a threshold BER, and/or a threshold BLER, the Tx device 502 may determine, at 510, an DMRS for transmission from the Tx device 502. For example, a DMRS with a PAPR that is closest, or close enough, to a PAPR of the data signal to be transmitted while meeting any other criteria relating to data reliability (BER and/or BLER) and/or power consumption may be determined to be the DMRS. In some aspects, the channel type is one or more of a delay spread dispersive channel, an additive white Gaussian noise channel (AWGN), or an additive signal-dependent Gaussian noise (ASDGN) channel. The non-linearity of the power amplifier, in some aspects, may be associated with a PA backoff magnitude (e.g., may be used, by the Tx device 502, to determine a PA backoff magnitude for the Tx device 502). For example, in some aspects, the PA backoff magnitude may be based on PAPR of a data transmission, and the DMRS is further identified based on a PAPR of the first DMRS. In some aspects, the MCS of the data transmission may be based on one or more of a suitable data rate associated with the data transmission or a suitable reliability as indicated by a suitable BER or BLER (e.g., a BER or BLER below a threshold BER and/or BLER value).

Based on the determination of the DMRS for transmission from the Tx device, the Tx device 502 may transmit, and the Rx device 504 may receive, a DMRS indication 512. The DMRS indication 512, in some aspects, may be transmitted via one of a MAC-CE or control information (e.g., DCI, UCI, or SCI). In some aspects, the DMRS indication 512 includes an indication of an MCS associated with the data transmission that, based on a mapping included in DMRS configuration 506 (e.g., a mapping in a set of mappings indicated by DMRS configuration indication 508), may indicate the DMRS to be used by the Tx device 502 for a subsequent DMRS transmission. In some aspects, the DMRS indication may include an index into an indexed list of possible (or candidate) DMRS included in the DMRS configuration 506. The DMRS indication 512, in some aspects, may include a sequence indication indicating one of a Zadoff-Chu sequence or a Gold sequence, and/or an MCS, associated with the DMRS determined at 510. The MCS associated with the DMRS determined at 510, in some aspects, may be one of a same MCS as an associated data transmission, or a different MCS as the associated data transmission. In some aspects, the DMRS indication 512 may include an indication of a time period for which to use the indicated DMRS sequence (or configuration). The indicated time period may be a particular amount of time or may be a dynamic amount of time based on receiving a subsequent DMRS indication (e.g., the indicated time period may be 'until another DMRS indication is received').

Based on the DMRS indication 512, the Tx device 502 may transmit, and Rx device 504 may receive, a DMRS 514. The DMRS 514, in some aspects, may be the DMRS indicated in DMRS indication 512 and the Rx device 504 may perform a channel estimation at 516 based on the received DMRS 514. The Tx device 502 may transmit, and the Rx device 504 may receive, data 518 associated with DMRS 514. The Rx device 504 may then decode the received data 518 based on the channel estimation at 516.

In some aspects, the Tx device 502 may transmit, and the Rx device 504 may receive, a DMRS configuration update 520. The DMRS configuration update 520 may indicate at least one of a change to a correspondence between a particular MCS in the set of more than two MCSs and a particular DMRS in the set of more than two DMRSs or an MCS to add to the set of more than two MCSs and a corresponding DMRS. The DMRS configuration update 520, in some aspects, may be transmitted via a MAC-CE.

The Rx device 504 may, independently, determine an DMRS for the Rx to use for an associated data transmission at 522. The Rx device 504 may then transmit, and Tx device 502 may receive, DMRS indication 524. In some aspects, the DMRS indication 524 may be based on the DMRS configuration 506, the DMRS configuration indication 508, or the DMRS configuration update 520. The Rx device 504 may then transmit, and the Tx device 502 may receive, a DMRS (not shown) as described above in relation to DMRS 514 that the Tx device 502 may use to perform a channel estimation (not shown) similar to the channel estimation performed by the Rx device 504 at 516. The Rx device 504 may also transmit, and the Tx device 502 may receive, data (not shown) associated with the DMRS (or DMRS indication 524) that may be decoded based on the channel estimation.

Figure 6:
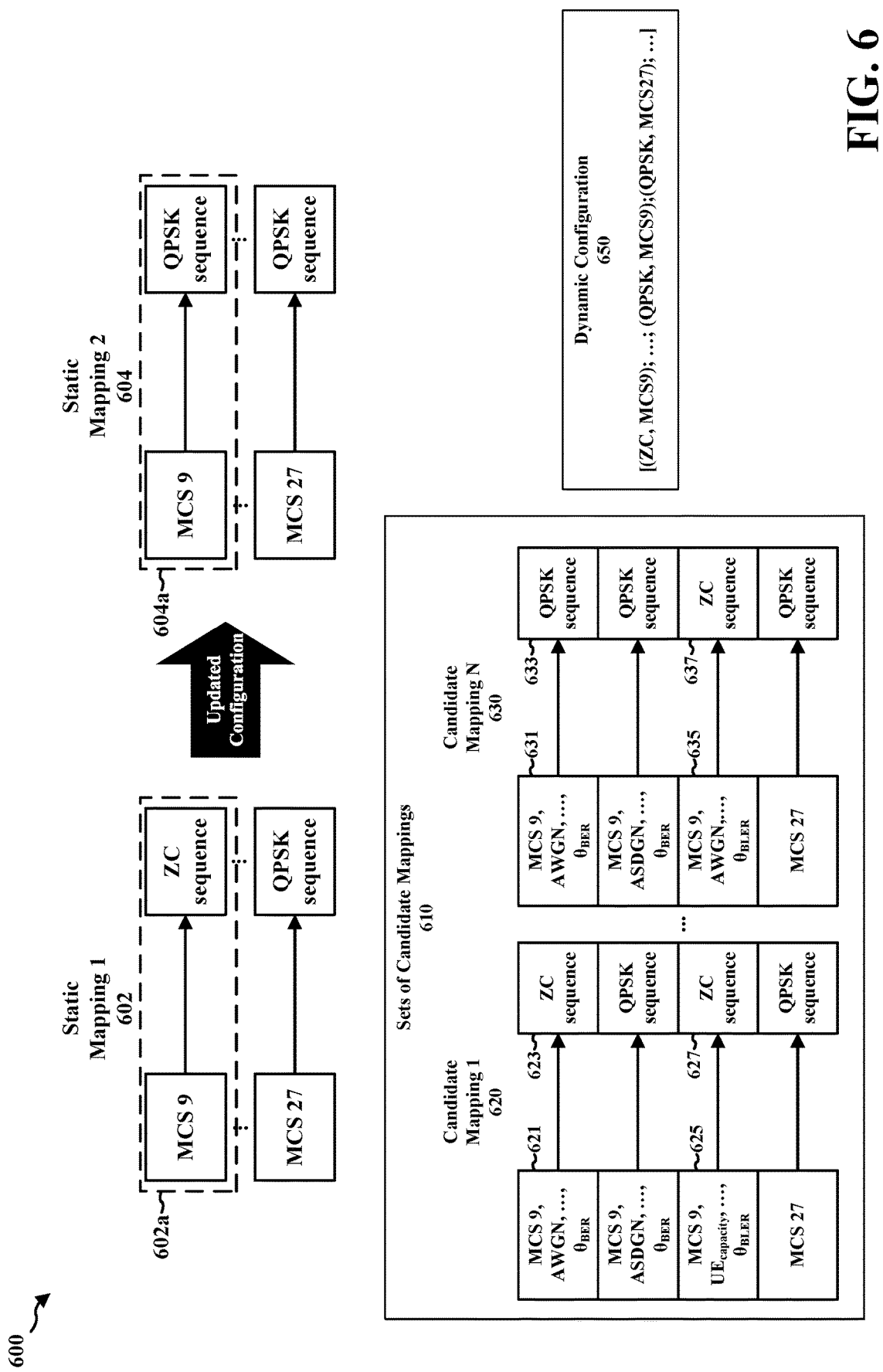
FIG. 6 is a diagram illustrating possible DMRS configurations in accordance with some aspects of the disclosure.

FIG. 6 is a diagram 600 illustrating possible DMRS configurations (e.g., including a first static DMRS configuration mapping 602, a second static DMRS configuration mapping 604, a candidate static DMRS mappings 610, or a fourth dynamic DMRS configuration 650) in accordance with some aspects of the disclosure. A first static DMRS configuration mapping 602 may include (1) a first mapping 602a of an indication of a data MCS index equal to 9 to a ZC sequence and (2) a second mapping of an indication of a data MCS index equal to 27 to a QPSK sequence. The first static DMRS configuration, in some aspects, may be transmitted as DMRS configuration 506 in FIG. 5. The first static DMRS configuration mapping 602 may be transmitted and/or received, in some aspects, via RRC signaling.

At a later time, an update to the first static DMRS configuration mapping 602 may be received (e.g., corresponding to DMRS configuration update 520). The update to the first static DMRS configuration mapping 602 may be transmitted and/or received via a MAC-CE, in some aspects. The update to the first static DMRS configuration mapping 602 may include an update to the first mapping 602a and the first static DMRS configuration mapping 602 may be updated to be a second static DMRS configuration mapping 604 including a second mapping 604a of an indication of a data MCS index equal to 9 to a QPSK sequence.

A third set of candidate static DMRS mappings 610 may include a first candidate DMRS mapping 620 and a second candidate DMRS mapping 630. The first and second candidate DMRS mappings may map sets of transmission characteristics (e.g., an MCS associated with the data transmission, a channel type, a threshold BER, a UE capability, etc.) to a particular DMRS configurations (e.g., a DMRS sequence and/or a MCS associated with the DMRS sequence). For example, the set of transmission characteristics 621 may be mapped to DMRS configuration 623 and the set of transmission characteristics 625 may be mapped to DMRS configuration 627 in the first candidate DMRS mapping 620 and the set of transmission characteristics 631 may be mapped to DMRS configuration 633 and the set of transmission characteristics 635 may be mapped to DMRS configuration 637 in the second candidate DMRS mapping 630. The candidate static DMRS mappings 610 may be received via RRC signaling and a particular candidate DMRS mapping to use may be indicated (e.g., by DMRS configuration indication 508 of FIG. 5) via one of a MAC-CE or DCI (or UCI and/or SCI). The selected (or indicated) candidate mapping to be used may be UE-specific (e.g., based on UE characteristics and/or capabilities).

Finally, a fourth dynamic DMRS configuration 650 may include an indexed list of DMRS configurations. In some aspects, one of the DMRS configurations in the indexed list may be designated as a default DMRS configuration. In some aspects, a Tx device may signal a particular DMRS configuration for an upcoming DMRS transmission dynamically via a MAC-CE or DCI (or UCI and/or SCI) including an index into the indexed list.

Figure 7:
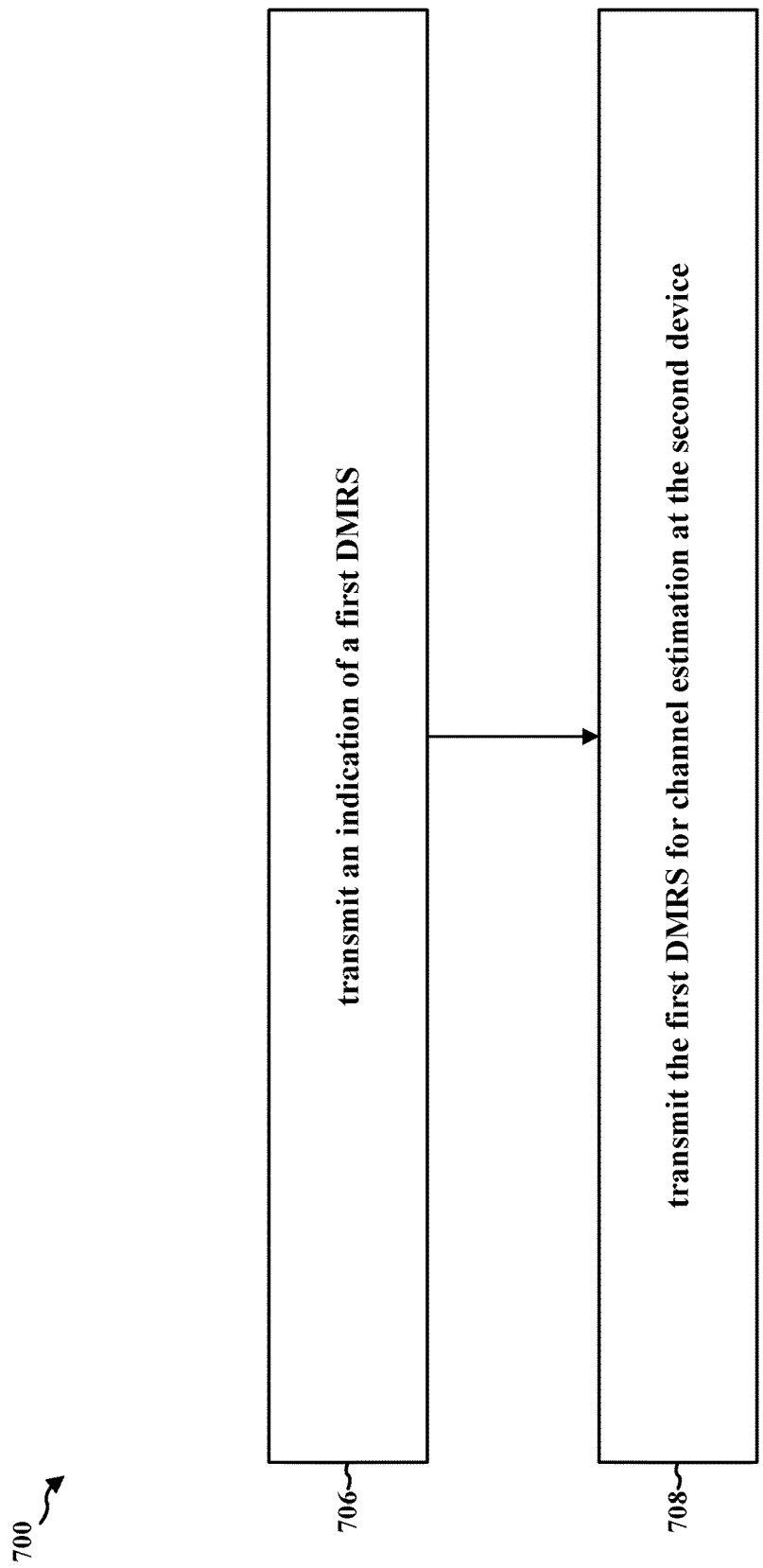
FIG. 7 is a flowchart of a method of wireless communication.

FIG. 7 is a flowchart 700 of a method of wireless communication. The method may be performed by a Tx device for wireless communication such as a wireless device (e.g., the UE 104; the Tx device 502; the apparatus 1104) or a network node (e.g., the base station 102; the Tx device 502 the network entity 1202). At 706, the Tx device may transmit an indication of a first DMRS. For example, 706 may be performed by application processor 1106, cellular baseband processor 1124, transceiver(s) 1122, antenna(s) 1180, CU processor 1212, DU processor 1232, RU processor 1242, transceiver(s) 1246, antenna(s) 1280, and/or DMRS-SS component 198 of FIGS. 11 and 12. The first DMRS, in some aspects, may be identified based on at least two of a non-linearity of a power amplifier of the first (Tx) device, a MCS used for a data transmission associated with the first DMRS, or a channel type of a channel associated with the first DMRS. The channel type, in some aspects, may be one or more of a delay spread dispersive channel, an AWGN, or an ASDGN channel. In some aspects, the non-linearity of the power amplifier is associated with a PA backoff magnitude based on a PAPR of the data transmission. The first DMRS, in some aspects, may further be identified based on the PAPR of the first DMRS.

In some aspects, the MCS used for the data transmission is based on one or more of a suitable data rate associated with the data transmission or a suitable reliability as indicated by a suitable BER or BLER (e.g., a BER and/or BLER below a threshold BER and/or BLER, respectively). The indication of the first DMRS, in some aspects, may include a sequence indication. The sequence indication, in some aspects, may indicate one of a ZC sequence or a Gold sequence associated with the first DMRS. The indication of the first DMRS, in some aspects, may include an MCS associated with the first DMRS. For example, referring to FIG. 5, the Tx device 502 may transmit, and Rx device 504 may receive, DMRS indication 512.

In some aspects, the indication of the first DMRS transmitted at 706 may be based on an DMRS configuration indicating at least one mapping between a set of more than two MCSs and a set of more than two DMRSs. In some aspects, the at least one mapping may be one mapping in which each MCS in the set of more than two MCSs is mapped to one DMRS in the set of more than two DMRSs. The at least one mapping, in some aspects, may be a plurality of mappings between a set of more than two MCSs and a set of more than two DMRSs where, for each mapping in the plurality of mappings, each MCS in the set of more than two MCSs is mapped to one DMRS in the set of more than two DMRS.

In some aspects, the DMRS configuration may be based on a set of characteristics of the second device. The set of characteristics may, in some aspects, include a capability (or inability) of the second device to process different types of signals (e.g., types of modulation). The DMRS configuration, in some aspects, includes a default DMRS. For example, referring to FIG. 5, the Tx device 502 may transmit DMRS configuration 506.

The indication of the first DMRS transmitted at 706, in some aspects, may further be based on an indication of a particular mapping in the plurality of mappings to use to identify an DMRS. In some aspects, the indication of the first DMRS may include an indication of an MCS associated with the data transmission. The particular mapping may be selected based on a set of characteristics of the Tx device or the second (Rx) device. For example, referring to FIG. 5, the Tx device 502 may transmit DMRS configuration indication 508.

At 708, the Tx device may transmit, for a second device, the first DMRS for channel estimation at the second device. For example, 708 may be performed by application processor 1106, cellular baseband processor 1124, transceiver(s) 1122, antenna(s) 1180, CU processor 1212, DU processor 1232, RU processor 1242, transceiver(s) 1246, antenna(s) 1280, and/or DMRS-SS component 198 of FIGS. 11 and 12. The first DMRS, in some aspects, may be transmitted based on the DMRS indication transmitted at 706. For example, referring to FIG. 5, the Tx device 502, and the Rx device 504 may receive, DMRS 514. The Rx device 504 may then use the DMRS 514 to perform a channel estimation at 516.

After transmitting the DMRS at 708, the Tx device may transmit a data transmission associated with the first DMRS. The data transmission, in some aspects, may use one of a same MCS as the associated first DMRS or a different MCS than the associated first DMRS. For example, referring to FIG. 5, the Tx device 502 may transmit, and the Rx device 504 may receive, data 518.

The Tx device may also transmit, for the second device, an update to the DMRS configuration indicating at least one of a change to a correspondence between a particular MCS in the set of more than two MCSs and a particular DMRS in the set of more than two DMRSs or an MCS to add to the set of more than two MCSs and a corresponding DMRS. In some aspects, the update may apply to a plurality of mappings received at 702. For example, referring to FIG. 5, the Tx device 502 may transmit, and the Rx device 504 may receive, DMRS configuration update 520. DMRS configuration update 520 may include updates to one or more of the mappings included in DMRS configuration 506.

In some aspects, the Tx device may receive, from the second device, an indication of a second DMRS for a channel estimation at the Tx device associated with a second data transmission from the second device. In some aspects, the second DMRS is different than the first DMRS based on one or more of the MCS associated with the data transmission from the second device, a waveform associated with the data transmission from the second device, or characteristics of the second device (e.g., a second power amplifier of the second device).

Figure 8:
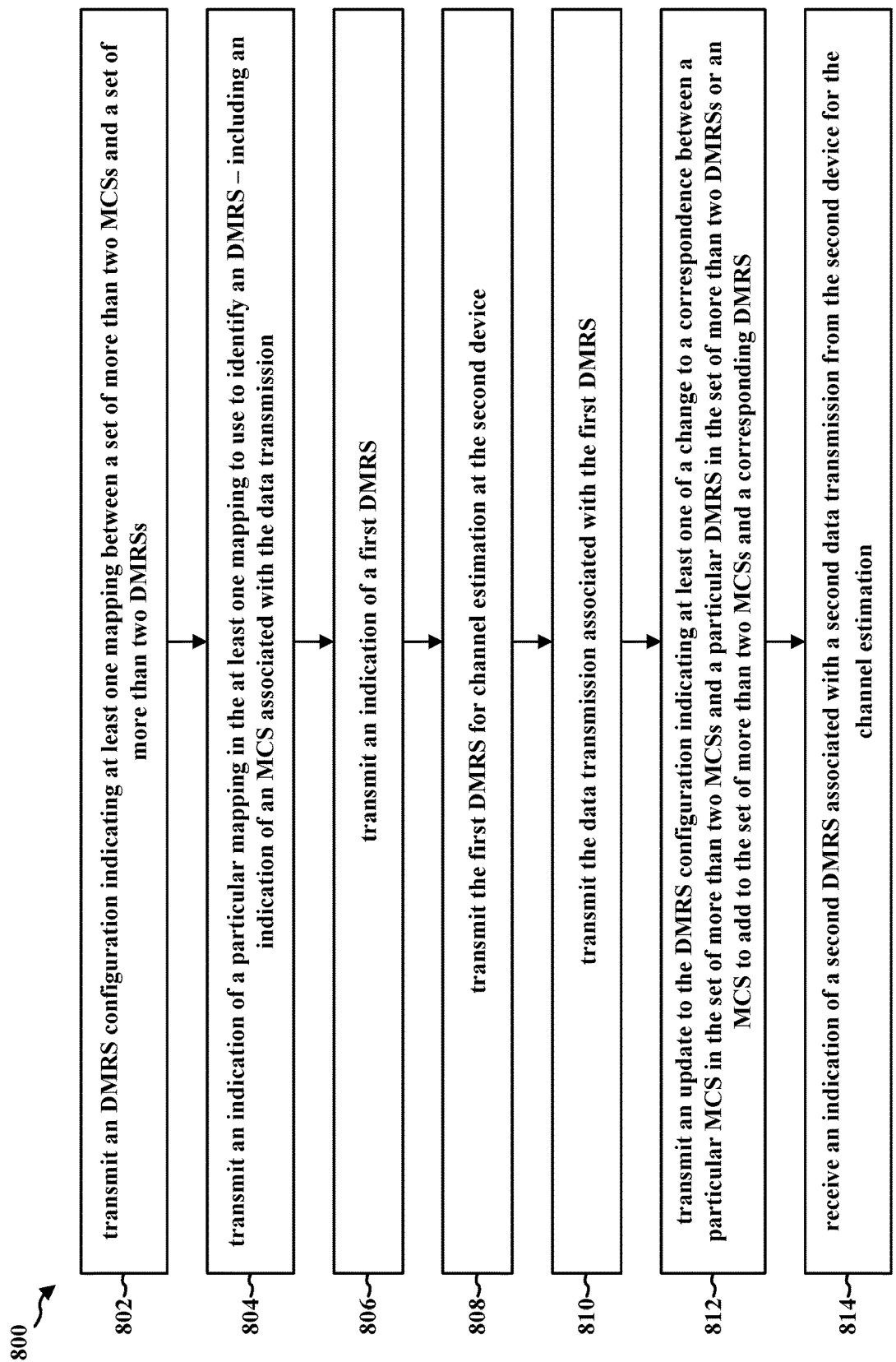
FIG. 8 is a flowchart of a method of wireless communication.

FIG. 8 is a flowchart 800 of a method of wireless communication. The method may be performed by a Tx device for wireless communication such as a wireless device (e.g., the UE 104; the Tx device 502; the apparatus 1104) or a network node (e.g., the base station 102; the Tx device 502 the network entity 1202). At 802, the Tx device may transmit, to a second device, an DMRS configuration indicating at least one mapping between a set of more than two MCSs and a set of more than two DMRSs. For example, 802 may be performed by application processor 1106, cellular baseband processor 1124, transceiver(s) 1122, antenna(s) 1180, CU processor 1212, DU processor 1232, RU processor 1242, transceiver(s) 1246, antenna(s) 1280, and/or DMRS-SS component 198 of FIGS. 11 and 12. In some aspects, the at least one mapping may be one mapping in which each MCS in the set of more than two MCSs is mapped to one DMRS in the set of more than two DMRSs. The at least one mapping, in some aspects, may be a plurality of mappings between a set of more than two MCSs and a set of more than two DMRSs where, for each mapping in the plurality of mappings, each MCS in the set of more than two MCSs is mapped to one DMRS in the set of more than two DMRS.

In some aspects, the DMRS configuration may be based on a set of characteristics of the second device. The set of characteristics may, in some aspects, include a capability (or inability) of the second device to process different types of signals (e.g., types of modulation). The DMRS configuration, in some aspects, includes a default DMRS. For example, referring to FIG. 5, the Tx device 502 may transmit DMRS configuration 506.

At 804, the Tx device may transmit an indication of a particular mapping in the plurality of mappings to use to identify an DMRS. For example, 804 may be performed by application processor 1106, cellular baseband processor 1124, transceiver(s) 1122, antenna(s) 1180, CU processor 1212, DU processor 1232, RU processor 1242, transceiver(s) 1246, antenna(s) 1280, and/or DMRS-SS component 198 of FIGS. 11 and 12. In some aspects, the indication of the first DMRS may include an indication of an MCS associated with the data transmission. The particular mapping may be selected based on a set of characteristics of the Tx device or the second (Rx) device. For example, referring to FIG. 5, the Tx device 502 may transmit DMRS configuration indication 508.

At 806, the Tx device may transmit an indication of a first DMRS. For example, 806 may be performed by application processor 1106, cellular baseband processor 1124, transceiver(s) 1122, antenna(s) 1180, CU processor 1212, DU processor 1232, RU processor 1242, transceiver(s) 1246, antenna(s) 1280, and/or DMRS-SS component 198 of FIGS. 11 and 12. The first DMRS, in some aspects, may be identified based on at least two of a non-linearity of a power amplifier of the first (Tx) device, a MCS used for a data transmission associated with the first DMRS, or a channel type of a channel associated with the first DMRS. The channel type, in some aspects, may be one or more of a delay spread dispersive channel, an AWGN, or an ASDGN channel. In some aspects, the non-linearity of the power amplifier is associated with a PA backoff magnitude based on a PAPR of the data transmission. The first DMRS, in some aspects, may further be identified based on the PAPR of the first DMRS.

In some aspects, the MCS used for the data transmission is based on one or more of a suitable data rate associated with the data transmission or a suitable reliability as indicated by a suitable BER or BLER (e.g., a BER and/or BLER below a threshold BER and/or BLER, respectively). The indication of the first DMRS, in some aspects, may include a sequence indication. The sequence indication, in some aspects, may indicate one of a ZC sequence or a Gold sequence associated with the first DMRS. The indication of the first DMRS, in some aspects, may include an MCS associated with the first DMRS. For example, referring to FIG. 5, the Tx device 502 may transmit, and Rx device 504 may receive, DMRS indication 512.

At 808, the Tx device may transmit, for a second device, the first DMRS for channel estimation at the second device. For example, 808 may be performed by application processor 1106, cellular baseband processor 1124, transceiver(s) 1122, antenna(s) 1180, CU processor 1212, DU processor 1232, RU processor 1242, transceiver(s) 1246, antenna(s) 1280, and/or DMRS-SS component 198 of FIGS. 11 and 12. The first DMRS, in some aspects, may be transmitted based on the DMRS indication transmitted at 806. For example, referring to FIG. 5, the Tx device 502, and the Rx device 504 may receive, DMRS 514. The Rx device 504 may then use the DMRS 514 to perform a channel estimation at 516.

After transmitting the DMRS at 808, the Tx device may transmit a data transmission associated with the first DMRS at 810. For example, 810 may be performed by application processor 1106, cellular baseband processor 1124, transceiver(s) 1122, antenna(s) 1180, CU processor 1212, DU processor 1232, RU processor 1242, transceiver(s) 1246, antenna(s) 1280, and/or DMRS-SS component 198 of FIGS. 11 and 12. The data transmission transmitted at 810, in some aspects, may use one of a same MCS as the associated first DMRS or a different MCS than the associated first DMRS. For example, referring to FIG. 5, the Tx device 502 may transmit, and the Rx device 504 may receive, data 518.

At 812, the Tx device may transmit, for the second device, an update to the DMRS configuration indicating at least one of a change to a correspondence between a particular MCS in the set of more than two MCSs and a particular DMRS in the set of more than two DMRSs or an MCS to add to the set of more than two MCSs and a corresponding DMRS. For example, 812 may be performed by application processor 1106, cellular baseband processor 1124, transceiver(s) 1122, antenna(s) 1180, CU processor 1212, DU processor 1232, RU processor 1242, transceiver(s) 1246, antenna(s) 1280, and/or DMRS-SS component 198 of FIGS. 11 and 12. In some aspects, the update may apply to a plurality of mappings received at 802. For example, referring to FIG. 5, the Tx device 502 may transmit, and the Rx device 504 may receive, DMRS configuration update 520. DMRS configuration update 520 may include updates to one or more of the mappings included in DMRS configuration 506.

Finally, at 814, the Tx device may receive, from the second device, an indication of a second DMRS for a channel estimation at the Tx device associated with a second data transmission from the second device. For example, 814 may be performed by application processor 1106, cellular baseband processor 1124, transceiver(s) 1122, antenna(s) 1180, CU processor 1212, DU processor 1232, RU processor 1242, transceiver(s) 1246, antenna(s) 1280, and/or DMRS-SS component 198 of FIGS. 11 and 12. In some aspects, the second DMRS is different than the first DMRS based on one or more of the MCS associated with the data transmission from the second device, a waveform associated with the data transmission from the second device, or characteristics of the second device (e.g., a second power amplifier of the second device). For example, referring to FIG. 5, the Rx device 504 may transmit, and the Tx device 502 may receive, DMRS indication 524.

Figure 9:
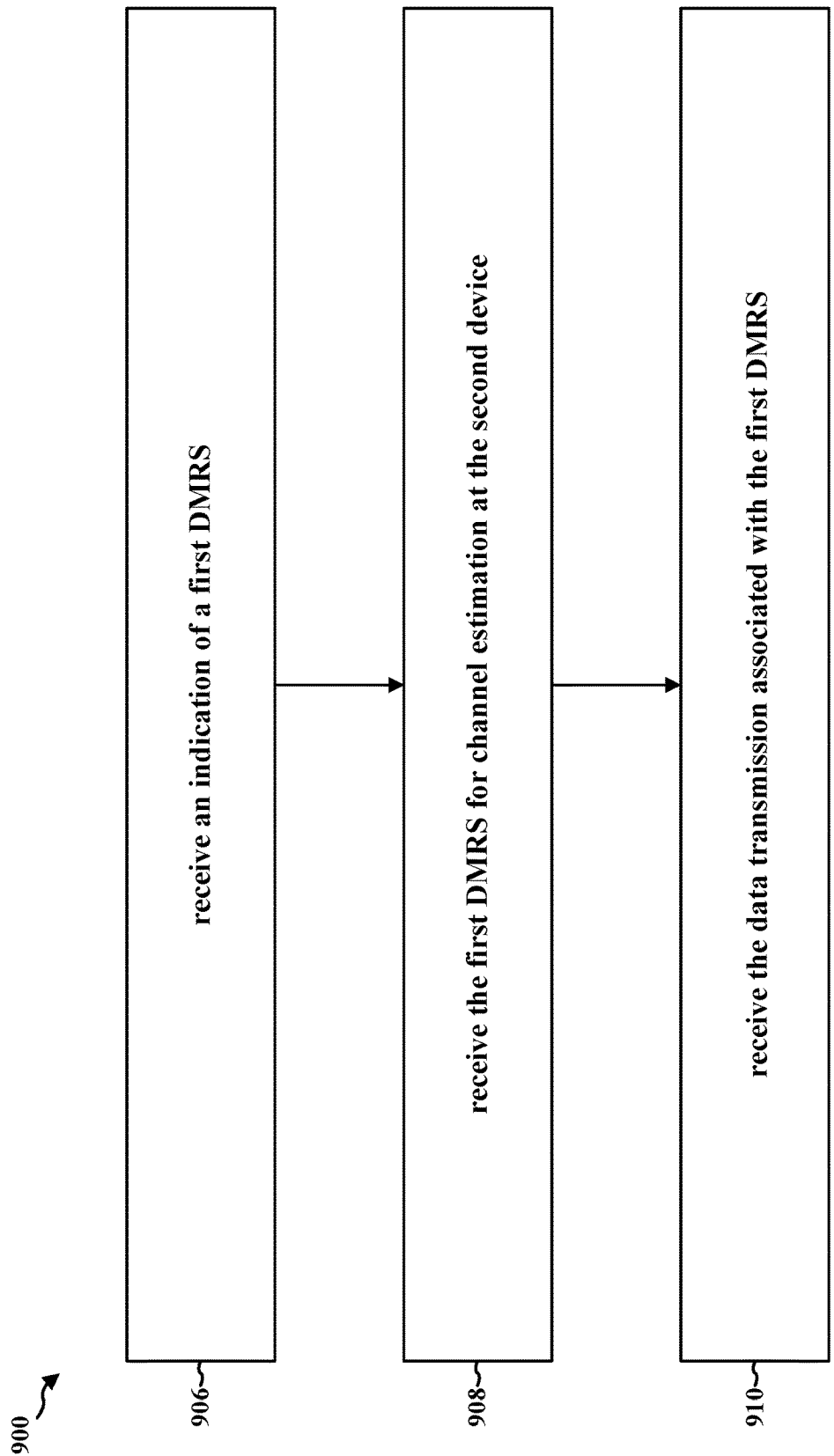
FIG. 9 is a flowchart of a method of wireless communication.

FIG. 9 is a flowchart 900 of a method of wireless communication. The method may be performed by a Rx device for wireless communication such as a wireless device (e.g., the UE 104; the Rx device 504; the apparatus 1104) or a network node (e.g., the base station 102; the Rx device 504 the network entity 1202). At 906, the Rx device may receive an indication of a first DMRS. For example, 906 may be performed by application processor 1106, cellular baseband processor 1124, transceiver(s) 1122, antenna(s) 1180, CU processor 1212, DU processor 1232, RU processor 1242, transceiver(s) 1246, antenna(s) 1280, and/or DMRS-SS component 198 of FIGS. 11 and 12. The first DMRS, in some aspects, may be identified based on at least two of a non-linearity of a power amplifier of the first (Tx) device, a MCS used for a data transmission associated with the first DMRS, or a channel type of a channel associated with the first DMRS. The channel type, in some aspects, may be one or more of a delay spread dispersive channel, an AWGN, or an ASDGN channel. In some aspects, the non-linearity of the power amplifier is associated with a PA backoff magnitude based on a PAPR of the data transmission. The first DMRS, in some aspects, may further be identified based on the PAPR of the first DMRS.

In some aspects, the MCS used for the data transmission is based on one or more of a suitable data rate associated with the data transmission or a suitable reliability as indicated by a suitable BER or BLER (e.g., a BER and/or BLER below a threshold BER and/or BLER, respectively). The indication of the first DMRS, in some aspects, may include a sequence indication. The sequence indication, in some aspects, may indicate one of a ZC sequence or a Gold sequence associated with the first DMRS. The indication of the first DMRS, in some aspects, may include an MCS associated with the first DMRS. For example, referring to FIG. 5, the Rx device 504 may receive, and Tx device 502 may transmit, DMRS indication 512.

In some aspects, the indication of the first DMRS transmitted at 906 may be based on an DMRS configuration indicating at least one mapping between a set of more than two MCSs and a set of more than two DMRSs. In some aspects, the at least one mapping may be one mapping in which each MCS in the set of more than two MCSs is mapped to one DMRS in the set of more than two DMRSs. The at least one mapping, in some aspects, may be a plurality of mappings between a set of more than two MCSs and a set of more than two DMRSs where, for each mapping in the plurality of mappings, each MCS in the set of more than two MCSs is mapped to one DMRS in the set of more than two DMRS.

In some aspects, the DMRS configuration may be based on a set of characteristics of the second (Rx) device. The set of characteristics may, in some aspects, include a capability (or inability) of the second (Rx) device to process different types of signals (e.g., types of modulation). The DMRS configuration, in some aspects, includes a default DMRS. For example, referring to FIG. 5, the Rx device 504 may receive DMRS configuration 506.

The indication of the first DMRS transmitted at 906, in some aspects, may further be based on an indication of a particular mapping in the plurality of mappings to use to identify an DMRS. In some aspects, the indication of the first DMRS may include an indication of an MCS associated with the data transmission. The particular mapping may be selected based on a set of characteristics of the first (Tx) device or the second (Rx) device. For example, referring to FIG. 5, the Rx device 504 may receive DMRS configuration indication 508.

At 908, the Rx device may receive, from the first (Tx) device, the first DMRS for channel estimation at the second (Rx) device. For example, 908 may be performed by application processor 1106, cellular baseband processor 1124, transceiver(s) 1122, antenna(s) 1180, CU processor 1212, DU processor 1232, RU processor 1242, transceiver(s) 1246, antenna(s) 1280, and/or DMRS-SS component 198 of FIGS. 11 and 12. The first DMRS, in some aspects, may be received based on the DMRS indication received at 906. For example, referring to FIG. 5, the Rx device 504 may receive, and the Tx device 502 may transmit, DMRS 514. The Rx device 504 may then use the DMRS 514 to perform a channel estimation at 516.

After receiving the DMRS at 908, the Rx device may receive, at 910, a data transmission associated with the first DMRS. For example, 910 may be performed by application processor 1106, cellular baseband processor 1124, transceiver(s) 1122, antenna(s) 1180, CU processor 1212, DU processor 1232, RU processor 1242, transceiver(s) 1246, antenna(s) 1280, and/or DMRS-SS component 198 of FIGS. 11 and 12. The data transmission, in some aspects, may use one of a same MCS as the associated first DMRS or a different MCS than the associated first DMRS. For example, referring to FIG. 5, the Rx device 504 may receive, and the Tx device 502 may transmit, data 518.

The Rx device may also receive, from the first (Tx) device, an update to the DMRS configuration indicating at least one of a change to a correspondence between a particular MCS in the set of more than two MCSs and a particular DMRS in the set of more than two DMRSs or an MCS to add to the set of more than two MCSs and a corresponding DMRS. In some aspects, the update may apply to a plurality of mappings received at 902. For example, referring to FIG. 5, the Rx device 504 may receive, and the Tx device 502 may transmit, DMRS configuration update 520. DMRS configuration update 520 may include updates to one or more of the mappings included in DMRS configuration 506.

In some aspects, the Rx device may transmit, to the first (Tx) device, an indication of a second DMRS for a channel estimation at the Rx device associated with a second data transmission from the second (Rx) device. In some aspects, the second DMRS is different than the first DMRS based on one or more of the MCS associated with the data transmission from the second (Rx) device, a waveform associated with the data transmission from the second (Rx) device, or characteristics of the second (Rx) device (e.g., a second power amplifier of the second (Rx) device).

Figure 10:
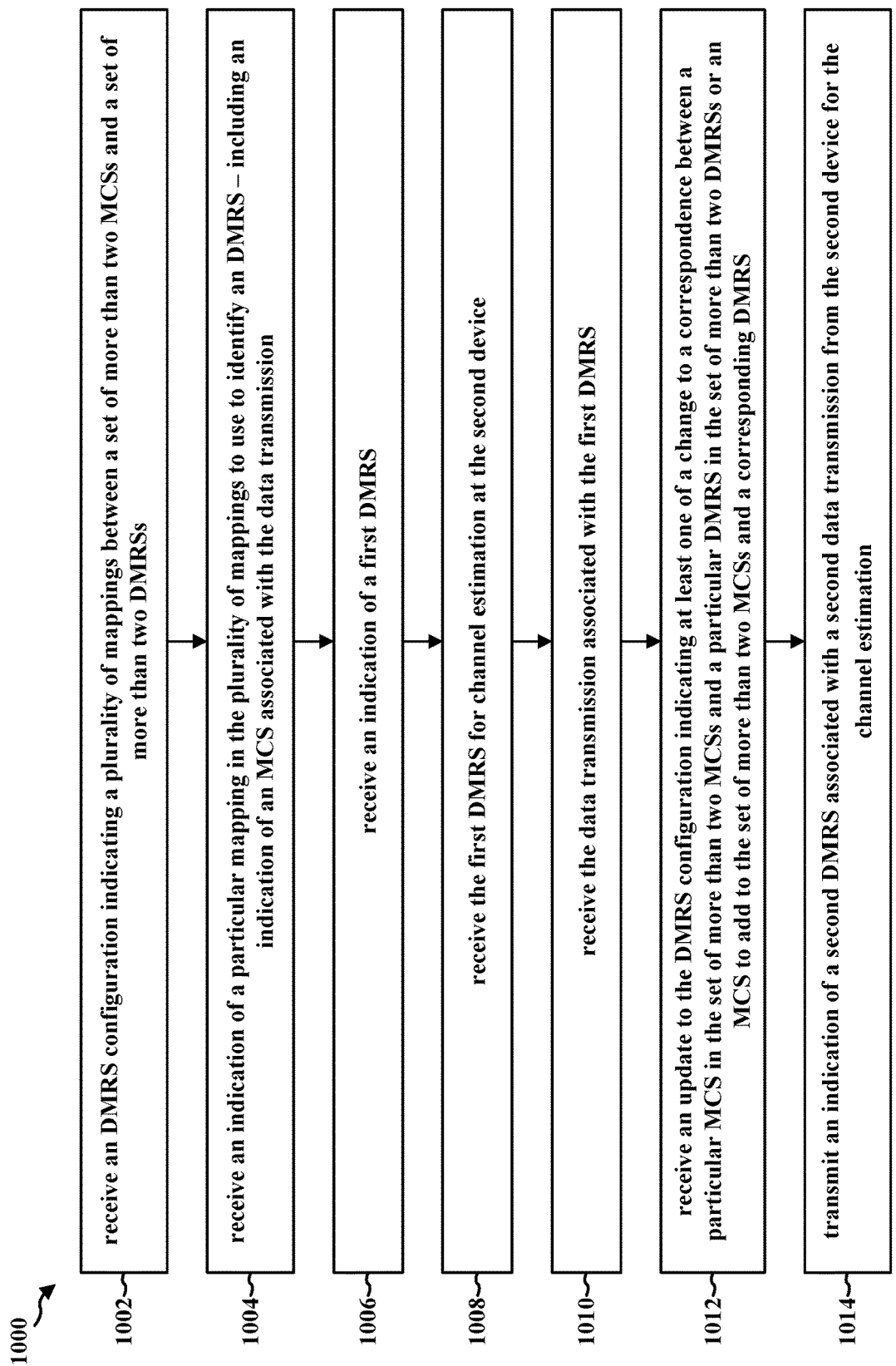
FIG. 10 is a flowchart of a method of wireless communication.

FIG. 10 is a flowchart 1000 of a method of wireless communication. The method may be performed by a Rx device for wireless communication such as a wireless device (e.g., the UE 104; the Rx device 504; the apparatus 1104) or a network node (e.g., the base station 102; the Rx device 504 the network entity 1202). At 1002, the Rx device may receive, from a first (Tx) device, an DMRS configuration indicating at least one mapping between a set of more than two MCSs and a set of more than two DMRSs. For example, 1002 may be performed by application processor 1106, cellular baseband processor 1124, transceiver(s) 1122, antenna(s) 1180, CU processor 1212, DU processor 1232, RU processor 1242, transceiver(s) 1246, antenna(s) 1280, and/or DMRS-SS component 198 of FIGS. 11 and 12. In some aspects, the at least one mapping may be one mapping in which each MCS in the set of more than two MCSs is mapped to one DMRS in the set of more than two DMRSs. The at least one mapping, in some aspects, may be a plurality of mappings between a set of more than two MCSs and a set of more than two DMRSs where, for each mapping in the plurality of mappings, each MCS in the set of more than two MCSs is mapped to one DMRS in the set of more than two DMRS.

In some aspects, the DMRS configuration may be based on a set of characteristics of the second (Rx) device. The set of characteristics may, in some aspects, include a capability (or inability) of the second (Rx) device to process different types of signals (e.g., types of modulation). The DMRS configuration, in some aspects, includes a default DMRS. For example, referring to FIG. 5, the Rx device 504 may receive DMRS configuration 506.

At 1004, the Rx device may receive an indication of a particular mapping in the plurality of mappings to use to identify an DMRS. For example, 1004 may be performed by application processor 1106, cellular baseband processor 1124, transceiver(s) 1122, antenna(s) 1180, CU processor 1212, DU processor 1232, RU processor 1242, transceiver(s) 1246, antenna(s) 1280, and/or DMRS-SS component 198 of FIGS. 11 and 12. In some aspects, the indication of the first DMRS may include an indication of an MCS associated with the data transmission. The particular mapping may be selected based on a set of characteristics of the Rx device or the second (Rx) device. For example, referring to FIG. 5, the Rx device 504 may receive DMRS configuration indication 508.

At 1006, the Rx device may receive an indication of a first DMRS. For example, 1006 may be performed by application processor 1106, cellular baseband processor 1124, transceiver(s) 1122, antenna(s) 1180, CU processor 1212, DU processor 1232, RU processor 1242, transceiver(s) 1246, antenna(s) 1280, and/or DMRS-SS component 198 of FIGS. 11 and 12. The first DMRS, in some aspects, may be identified based on at least two of a non-linearity of a power amplifier of the first (Tx) device, a MCS used for a data transmission associated with the first DMRS, or a channel type of a channel associated with the first DMRS. The channel type, in some aspects, may be one or more of a delay spread dispersive channel, an AWGN, or an ASDGN channel. In some aspects, the non-linearity of the power amplifier is associated with a PA backoff magnitude based on a PAPR of the data transmission. The first DMRS, in some aspects, may further be identified based on the PAPR of the first DMRS.

In some aspects, the MCS used for the data transmission is based on one or more of a suitable data rate associated with the data transmission or a suitable reliability as indicated by a suitable BER or BLER (e.g., a BER and/or BLER below a threshold BER and/or BLER, respectively). The indication of the first DMRS, in some aspects, may include a sequence indication. The sequence indication, in some aspects, may indicate one of a ZC sequence or a Gold sequence associated with the first DMRS. The indication of the first DMRS, in some aspects, may include an MCS associated with the first DMRS. For example, referring to FIG. 5, the Rx device 504 may receive, and Tx device 502 may transmit, DMRS indication 512.

At 1008, the Rx device may receive, from the first (Tx) device, the first DMRS for channel estimation at the second (Rx) device. For example, 1008 may be performed by application processor 1106, cellular baseband processor 1124, transceiver(s) 1122, antenna(s) 1180, CU processor 1212, DU processor 1232, RU processor 1242, transceiver(s) 1246, antenna(s) 1280, and/or DMRS-SS component 198 of FIGS. 11 and 12. The first DMRS, in some aspects, may be received based on the DMRS indication received at 1006. For example, referring to FIG. 5, the Rx device 504, and the Tx device 502 may receive, DMRS 514. The Tx device 502 may then use the DMRS 514 to perform a channel estimation at 516.

After receiving the DMRS at 1008, the Rx device may receive a data transmission associated with the first DMRS at 1010. For example, 1010 may be performed by application processor 1106, cellular baseband processor 1124, transceiver(s) 1122, antenna(s) 1180, CU processor 1212, DU processor 1232, RU processor 1242, transceiver(s) 1246, antenna(s) 1280, and/or DMRS-SS component 198 of FIGS. 11 and 12. The data transmission received at 1010, in some aspects, may use one of a same MCS as the associated first DMRS or a different MCS than the associated first DMRS. For example, referring to FIG. 5, the Rx device 504 may receive, and the Tx device 502 may transmit, data 518.

At 1012, the Rx device may receive, from the first (Tx) device, an update to the DMRS configuration indicating at least one of a change to a correspondence between a particular MCS in the set of more than two MCSs and a particular DMRS in the set of more than two DMRSs or an MCS to add to the set of more than two MCSs and a corresponding DMRS. For example, 1012 may be performed by application processor 1106, cellular baseband processor 1124, transceiver(s) 1122, antenna(s) 1180, CU processor 1212, DU processor 1232, RU processor 1242, transceiver(s) 1246, antenna(s) 1280, and/or DMRS-SS component 198 of FIGS. 11 and 12. In some aspects, the update may apply to a plurality of mappings received at 1002. For example, referring to FIG. 5, the Rx device 504 may receive, and the Tx device 502 may transmit, DMRS configuration update 520. DMRS configuration update 520 may include updates to one or more of the mappings included in DMRS configuration 506.

Finally, at 1014, the Rx device may transmit, to the first (Tx) device, an indication of a second DMRS for a channel estimation at the Tx device associated with a second data transmission from the second (Rx) device. For example, 1014 may be performed by application processor 1106, cellular baseband processor 1124, transceiver(s) 1122, antenna(s) 1180, CU processor 1212, DU processor 1232, RU processor 1242, transceiver(s) 1246, antenna(s) 1280, and/or DMRS-SS component 198 of FIGS. 11 and 12. In some aspects, the second DMRS is different than the first DMRS based on one or more of the MCS associated with the data transmission from the second (Rx) device, a waveform associated with the data transmission from the second (Rx) device, or characteristics of the second (Rx) device (e.g., a second power amplifier of the second (Rx) device). For example, referring to FIG. 5, the Rx device 504 may transmit, and the Tx device 502 may receive, DMRS indication 524.

Figure 11:
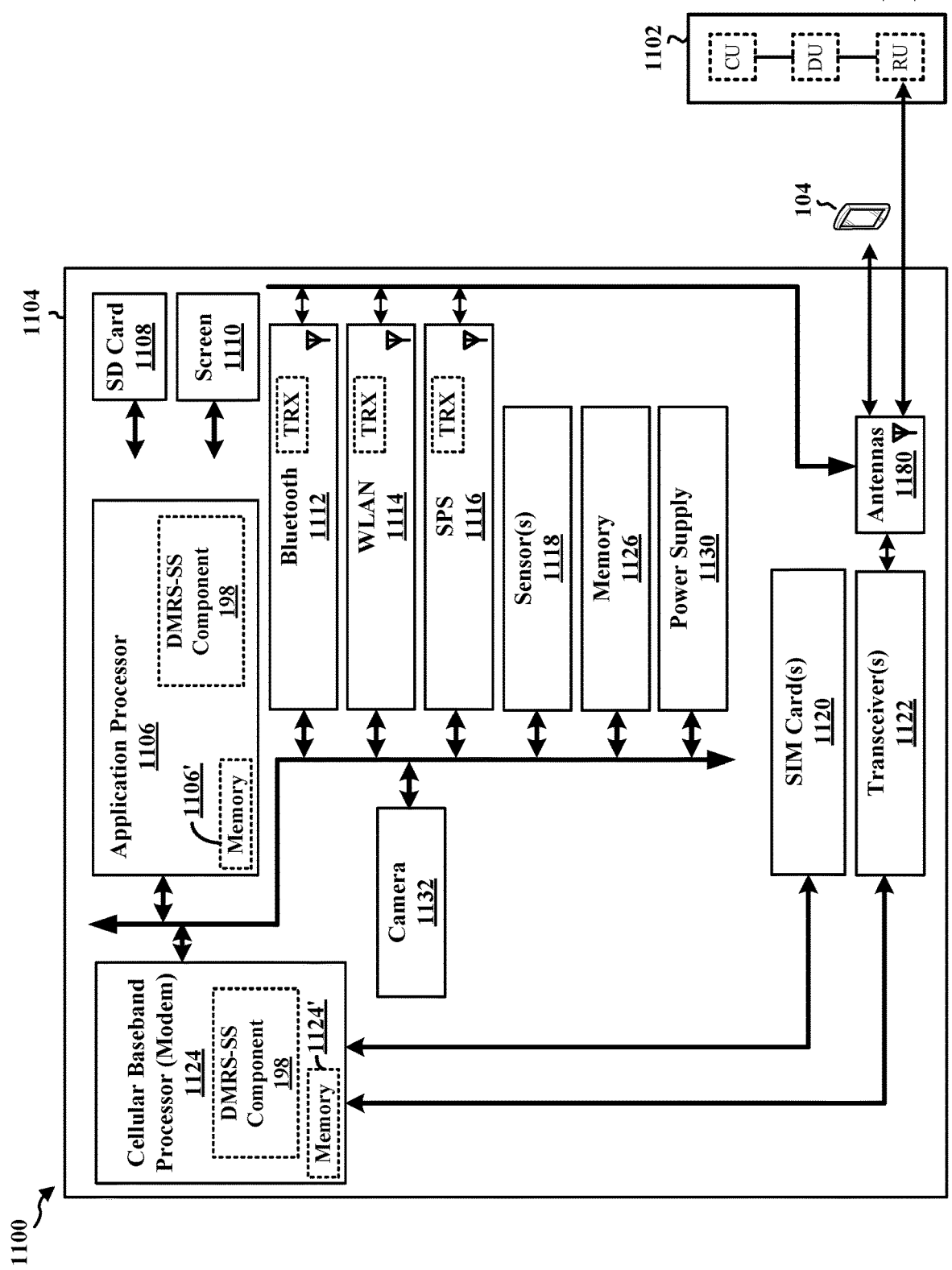
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see 350 of FIG. 3) and include the additional modules of the apparatus 1104.

As discussed supra, the DMRS-SS component 198 is configured to transmit an indication of a first DMRS and transmit, for a second device, the first DMRS for channel estimation at the second device. The DMRS-SS component 198 may be configured to receive an indication of a first DMRS associated with a first device; receive, from the first device, the first DMRS for channel estimation; and receive the data transmission associated with the first DMRS. The DMRS-SS component 198 may be within the cellular baseband processor 1124, the application processor 1106, or both the cellular baseband processor 1124 and the application processor 1106. The DMRS-SS component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, includes means for transmitting an indication of a first DMRS. The apparatus 1104, and in particular the cellular baseband processor 1124 and/or the application processor 1106, may also include means for transmitting, for a second device, the first DMRS for channel estimation at the second device. The apparatus 1104, and in particular the cellular baseband processor 1124 and/or the application processor 1106, may also include means for transmitting, for the second device, an DMRS configuration indicating a mapping between a set of more than two MCSs and a set of more than two DMRSs, where each MCS in the set of more than two MCSs is mapped to one DMRS in the set of more than two DMRSs, where the indication of the first DMRS includes an indication of the MCS associated with the data transmission. The apparatus 1104, and in particular the cellular baseband processor 1124 and/or the application processor 1106, may also include means for transmitting, for the second device, an update to the DMRS configuration indicating at least one of a change to a correspondence between a particular MCS in the set of more than two MCSs and a particular DMRS in the set of more than two DMRSs or an MCS to add to the set of more than two MCSs and a corresponding DMRS. The apparatus 1104, and in particular the cellular baseband processor 1124 and/or the application processor 1106, may also include means for transmitting, for the second device, an DMRS configuration indicating a plurality of mappings between a set of more than two MCSs and a set of more than two DMRSs, where, for each mapping in the plurality of mappings, each MCS in the set of more than two MCSs is mapped to one DMRS in the set of more than two DMRSs. The apparatus 1104, and in particular the cellular baseband processor 1124 and/or the application processor 1106, may also include means for transmitting an indication of a particular mapping in the plurality of mappings to use to identify an DMRS, where the indication of the first DMRS includes an indication of an MCS associated with the data transmission. The apparatus 1104, and in particular the cellular baseband processor 1124 and/or the application processor 1106, may also include means for receiving an indication of a second DMRS associated with a second data transmission from the second device for a channel estimation at the first device. The apparatus 1104, and in particular the cellular baseband processor 1124 and/or the application processor 1106, may also include means for receiving an indication of a first DMRS associated with a first device, where the first DMRS is identified based on at least two of a non-linearity of a power amplifier of the first device, a MCS used for a data transmission associated with the first DMRS, or a channel type of a channel associated with the first DMRS. The apparatus 1104, and in particular the cellular baseband processor 1124 and/or the application processor 1106, may also include means for receiving, from the first device, the first DMRS for channel estimation. The apparatus 1104, and in particular the cellular baseband processor 1124 and/or the application processor 1106, may also include means for receiving the data transmission associated with the first DMRS. The apparatus 1104, and in particular the cellular baseband processor 1124 and/or the application processor 1106, may also include means for receiving, from the first device, an DMRS configuration indicating a mapping between a set of more than two MCSs and a set of more than two DMRSs, where each MCS in the set of more than two MCSs is mapped to one DMRS in the set of more than two DMRSs, where the indication of the first DMRS includes an indication of the MCS associated with the data transmission. The apparatus 1104, and in particular the cellular baseband processor 1124 and/or the application processor 1106, may also include means for receiving, from the first device, an update to the DMRS configuration indicating at least one of a change to a correspondence between a particular MCS in the set of more than two MCSs and a particular DMRS in the set of more than two DMRSs or an MCS to add to the set of more than two MCSs and a corresponding DMRS. The apparatus 1104, and in particular the cellular baseband processor 1124 and/or the application processor 1106, may also include means for receiving, from the first device, an DMRS configuration indicating a plurality of mappings between a set of more than two MCSs and a set of more than two DMRSs, where, for each mapping in the plurality of mappings, each MCS in the set of more than two MCSs is mapped to one DMRS in the set of more than two DMRSs. The apparatus 1104, and in particular the cellular baseband processor 1124 and/or the application processor 1106, may also include means for receiving an indication of a particular mapping in the plurality of mappings to use to identify an DMRS, where the indication of the first DMRS includes an indication of the MCS associated with the data transmission. The apparatus 1104, and in particular the cellular baseband processor 1124 and/or the application processor 1106, may also include means for transmitting an indication of a second DMRS associated with a second data transmission from the second device for the channel estimation at the first device. The apparatus may include means for performing any of the aspects described in connection with the call flow diagram 500 of FIG. 5 or the flowcharts in FIGS. 7-10. The means may be the DMRS-SS component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
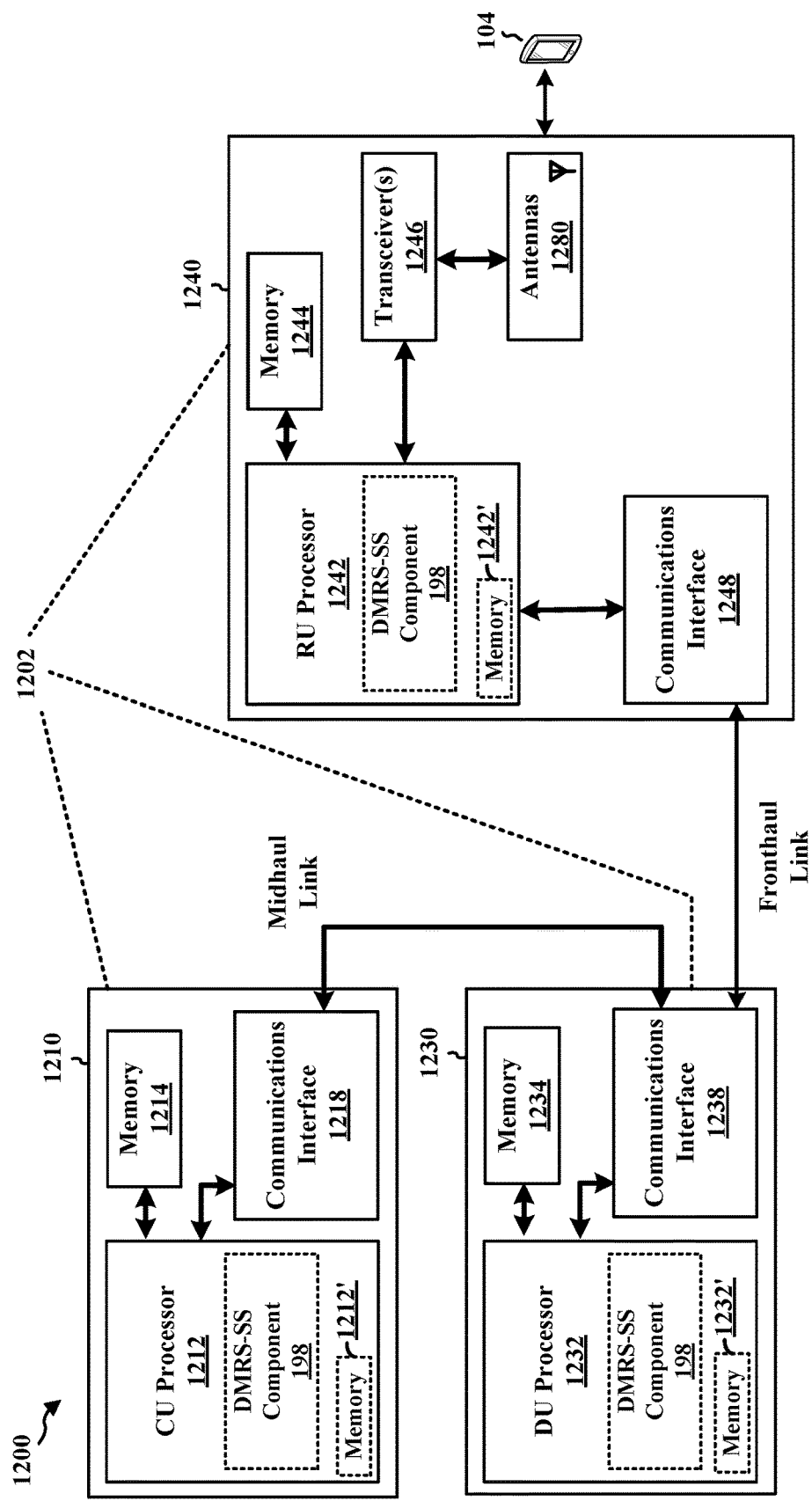
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the DMRS-SS component 198, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the DMRS-SS component 198 is configured to transmit an indication of a first DMRS and transmit, for a second device, the first DMRS for channel estimation at the second device. The DMRS-SS component 198 may be configured to receive an indication of a first DMRS associated with a first device; receive, from the first device, the first DMRS for channel estimation; and receive the data transmission associated with the first DMRS. The DMRS-SS component 198 may be within one or more processors of one or more of the CU 1210, DU 1230, and the RU 1240. The DMRS-SS component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 includes means for transmitting an indication of a first DMRS. The network entity 1102 may also include means for transmitting, for a second device, the first DMRS for channel estimation at the second device. The network entity 1102 may also include means for transmitting, for the second device, an DMRS configuration indicating a mapping between a set of more than two MCSs and a set of more than two DMRSs, where each MCS in the set of more than two MCSs is mapped to one DMRS in the set of more than two DMRSs, where the indication of the first DMRS includes an indication of the MCS associated with the data transmission. The network entity 1102 may also include means for transmitting, for the second device, an update to the DMRS configuration indicating at least one of a change to a correspondence between a particular MCS in the set of more than two MCSs and a particular DMRS in the set of more than two DMRSs or an MCS to add to the set of more than two MCSs and a corresponding DMRS. The network entity 1102 may also include means for transmitting, for the second device, an DMRS configuration indicating a plurality of mappings between a set of more than two MCSs and a set of more than two DMRSs, where, for each mapping in the plurality of mappings, each MCS in the set of more than two MCSs is mapped to one DMRS in the set of more than two DMRSs. The network entity 1102 may also include means for transmitting an indication of a particular mapping in the plurality of mappings to use to identify an DMRS, where the indication of the first DMRS includes an indication of an MCS associated with the data transmission. The network entity 1102 may also include means for receiving an indication of a second DMRS associated with a second data transmission from the second device for a channel estimation at the first device. The network entity 1102 may also include means for receiving an indication of a first DMRS associated with a first device, where the first DMRS is identified based on at least two of a non-linearity of a power amplifier of the first device, a MCS used for a data transmission associated with the first DMRS, or a channel type of a channel associated with the first DMRS. The network entity 1102 may also include means for receiving, from the first device, the first DMRS for channel estimation. The network entity 1102 may also include means for receiving the data transmission associated with the first DMRS. The network entity 1102 may also include means for receiving, from the first device, an DMRS configuration indicating a mapping between a set of more than two MCSs and a set of more than two DMRSs, where each MCS in the set of more than two MCSs is mapped to one DMRS in the set of more than two DMRSs, where the indication of the first DMRS includes an indication of the MCS associated with the data transmission. The network entity 1102 may also include means for receiving, from the first device, an update to the DMRS configuration indicating at least one of a change to a correspondence between a particular MCS in the set of more than two MCSs and a particular DMRS in the set of more than two DMRSs or an MCS to add to the set of more than two MCSs and a corresponding DMRS. The network entity 1102 may also include means for receiving, from the first device, an DMRS configuration indicating a plurality of mappings between a set of more than two MCSs and a set of more than two DMRSs, where, for each mapping in the plurality of mappings, each MCS in the set of more than two MCSs is mapped to one DMRS in the set of more than two DMRSs. The network entity 1102 may also include means for receiving an indication of a particular mapping in the plurality of mappings to use to identify an DMRS, where the indication of the first DMRS includes an indication of the MCS associated with the data transmission. The network entity 1102 may also include means for transmitting an indication of a second DMRS associated with a second data transmission from the second device for the channel estimation at the first device. The apparatus may include means for performing any of the aspects described in connection with the call flow diagram 500 of FIG. 5 or the flowcharts in FIGS. 7-10. The means may be the DMRS-SS component 198 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

In some aspects of wireless communications, PA and/or a power amplifier may be used to increase the power of signals (e.g., to improve the quality of transmissions). In some aspects, power amplifiers produce nonlinear distortions due to a saturation property. The PA nonlinear distortion, in some aspects, leads to interference both in the frequency band of transmitted signal (in-band) (e.g., increasing EVM at the receiving device) and in the adjacent frequency bands (out-of-band). The in-band interference caused by nonlinear PA, in some aspects, may degrade the reception performance, while the out-of-band interference may harm the communication systems operating in the adjacent frequency channels. In order not to severely interfere with communication systems operating in the adjacent channels, a transmit spectrum mask may be adopted. To reduce the effects of nonlinear distortion both in-band and out-of-band, a power amplifier should operate in, or close to, a linear region, e.g., the region which is not close to the PA saturation point. In order to operate in, or close to, the linear region the power amplifier may employ a PA backoff (e.g., a reduction in input power to decrease the difference between the ideal (linear) and the actual (saturated) output power). A larger PA backoff, in some aspects, may reduce the transmit power, resulting in reduced power amplifier efficiency and potentially lead to performance degradation for the amplified signal.

In some aspects of wireless communication, e.g., 5G NR, DMRS sequences may be used for channel estimation purposes. The choice of DMRS sequence depends on various factors, e.g., PAPR, good autocorrelation and cross correlation properties, and/or other signal or channel characteristics. For a UL DFT-s-OFDM waveform, in some aspects, a Zadoff-Chu (ZC) sequence may be used in PUCCH and PUSCH across all MCSs (including $\pi/2$ BPSK). In some aspects, ZC sequences may be used in PUSCH and PUCCH for MCSs not including $\pi/2$ BPSK, where for $\pi/2$ BPSK-modulated PUCCH and PUSCH, a $\pi/2$ BPSK DMRS is used. In some aspects, the use of the $\pi/2$ BPSK DMRS is based on a ZC DMRS having ~1.6 dB higher PAPR than $\pi/2$ BPSK-modulated data. A DMRS sequence having a higher PAPR (e.g., a ZC DMRS) may be affected by the nonlinear PA more severely compared to a data transmission having a lower PAPR (e.g., $\pi/2$ BPSK-modulated data). Accordingly, using the example of a ZC DMRS sequence and $\pi/2$ BPSK-modulated data, the ZC DMRS sequence experiences a different combined effective wireless channel than $\pi/2$ BPSK modulated data. Similar differences in combined effective wireless channel may be experience for other MCSs as well (e.g., for QPSK, 16-QAM, 64-QAM, etc.).

A receiving device using the DMRS sequence having a higher PAPR for channel estimation may be systematically inaccurate as to the effect of the PA nonlinearity on the transmission of data having a lower PAPR from the transmitting device (e.g., may overestimate the effect of the PA non-linearity on the lower-PAPR data transmission). The disclosure presents a method and apparatus for determining a suitable (or optimized) DMRS sequence and/or PA backoff based on a number of factors including a MCS used for an associated data transmission, a PA non-linearity at a transmitting device, a numerology, a channel type associated with the DMRS and/or the data transmission, a threshold BER, and/or a threshold BLER. The disclosure further presents a method and or apparatus for signaling the determined DMRS It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first device, including transmitting an indication of a first DMRS, where the first DMRS is identified based on at least two of a non-linearity of a power amplifier of the first device, a MCS used for a data transmission associated with the first DMRS, or a channel type of a channel associated with the first DMRS; and transmitting, for a second device, the first DMRS for channel estimation at the second device.

Aspect 2 is the method of aspect 1, further including transmitting, for the second device, an DMRS configuration indicating a mapping between a set of more than two MCSs and a set of more than two DMRSs, where each MCS in the set of more than two MCSs is mapped to one DMRS in the set of more than two DMRSs, where the indication of the first DMRS includes an indication of the MCS associated with the data transmission.

Aspect 3 is the method of aspect 2, further including transmitting, for the second device, an update to the DMRS configuration indicating at least one of a change to a correspondence between a particular MCS in the set of more than two MCSs and a particular DMRS in the set of more than two DMRSs or an MCS to add to the set of more than two MCSs and a corresponding DMRS.

Aspect 4 is the method of any of aspects 2 or 3, where the DMRS configuration is based on a set of characteristics of the second device.

Aspect 5 is the method of any of aspects 2 to 4, where the DMRS configuration further includes a default DMRS.

Aspect 6 is the method of aspects 1 to 5, further including transmitting, for the second device, an DMRS configuration indicating a plurality of mappings between a set of more than two MCSs and a set of more than two DMRSs, where, for each mapping in the plurality of mappings, each MCS in the set of more than two MCSs is mapped to one DMRS in the set of more than two DMRSs; and transmitting an indication of a particular mapping in the plurality of mappings to use to identify an DMRS, where the indication of the first DMRS includes an indication of an MCS associated with the data transmission.

Aspect 7 is the method of aspects 1 to 6, where the indication of the first DMRS includes (1) a sequence indication indicating one of a Zadoff-chu sequence or a gold sequence associated with the first DMRS and (2) an MCS associated with the first DMRS.

Aspect 8 is the method of aspects 1 to 7, further including receiving an indication of a second DMRS associated with a second data transmission from the second device for a channel estimation at the first device.

Aspect 9 is the method of aspect 8, where the second DMRS is different than the first DMRS based on one or more of the MCS associated with the data transmission from the second device, a waveform associated with the data transmission from the second device, or characteristics of a second power amplifier of the second device.

Aspect 10 is the method of aspects 1 to 9, where the first DMRS is configured to be used for one of an indicated time or until a time indicated by a transmission of a different DMRS.

Aspect 11 is the method of aspects 1 to 10, where the channel type is one or more of a delay spread dispersive channel, an AWGN channel, or an ASDGN channel.

Aspect 12 is the method of aspects 1 to 11, where the non-linearity of the power amplifier is associated with a PA backoff magnitude.

Aspect 13 is the method of aspects 1 to 12, where the PA backoff magnitude is based on a PAPR of the data transmission, and the first DMRS is further identified based on a PAPR of the first DMRS.

Aspect 14 is the method of aspects 1 to 13, where the MCS used for the data transmission is based on one or more of a suitable data rate associated with the data transmission or a suitable reliability as indicated by a suitable BER or block error rate BLER.

Aspect 15 is a method of wireless communication at a second device, including receiving an indication of a first DMRS associated with a first device, where the first DMRS is identified based on at least two of a non-linearity of a power amplifier of the first device, a MCS used for a data transmission associated with the first DMRS, or a channel type of a channel associated with the first DMRS; receiving, from the first device, the first DMRS for channel estimation; and receiving the data transmission associated with the first DMRS.

Aspect 16 is the method of aspect 15, further including receiving, from the first device, an DMRS configuration indicating a mapping between a set of more than two MCSs and a set of more than two DMRSs, where each MCS in the set of more than two MCSs is mapped to one DMRS in the set of more than two DMRSs, where the indication of the first DMRS includes an indication of the MCS associated with the data transmission.

Aspect 17 is the method of aspect 16, further including receiving, from the first device, an update to the DMRS configuration indicating at least one of a change to a correspondence between a particular MCS in the set of more than two MCSs and a particular DMRS in the set of more than two DMRSs or an MCS to add to the set of more than two MCSs and a corresponding DMRS.

Aspect 18 is the method of any of aspects 16 or 17, where the DMRS configuration is based on a set of characteristics of the second device.

Aspect 19 is the method of any of aspects 16 to 18, where the DMRS configuration further includes a default DMRS.

Aspect 20 is the method of aspects 15 to 19, further including receiving, from the first device, an DMRS configuration indicating a plurality of mappings between a set of more than two MCSs and a set of more than two DMRSs, where, for each mapping in the plurality of mappings, each MCS in the set of more than two MCSs is mapped to one DMRS in the set of more than two DMRSs; and receiving an indication of a particular mapping in the plurality of mappings to use to identify an DMRS, where the indication of the first DMRS includes an indication of the MCS associated with the data transmission.

Aspect 21 is the method of aspects 15 to 20, where the indication of the first DMRS includes (1) a sequence indication indicating one of a Zadoff-chu sequence or a gold sequence associated with the first DMRS and (2) an MCS associated with the first DMRS.

Aspect 22 is the method of aspects 15 to 21, further including transmitting an indication of a second DMRS associated with a second data transmission from the second device for the channel estimation at the first device.

Aspect 23 is the method of aspect 22, where the second DMRS is different than the first DMRS based on one or more of the MCS associated with the data transmission from the second device, a waveform associated with the data transmission from the second device, or characteristics of a second power amplifier of the second device.

Aspect 24 is the method of aspects 1 to 9, where the first DMRS is configured to be used for one of an indicated time or until a time indicated by a transmission of a different DMRS.

Aspect 25 is the method of aspects 15 to 24, where the channel type is one or more of a delay spread dispersive channel, an AWGN channel, or an ASDGN channel.

Aspect 26 is the method of aspects 15 to 25, where the non-linearity of the power amplifier is associated with a PA backoff magnitude.

Aspect 27 is the method of aspects 15 to 26, where the PA backoff magnitude is based on a PAPR of the data transmission, and the first DMRS is further identified based on a PAPR of the first DMRS.

Aspect 28 is the method of aspects 15 to 27, where the MCS used for the data transmission is based on one or more of a suitable data rate associated with the data transmission or a suitable reliability as indicated by a suitable BER or block error rate BLER.

Aspect 29 is an apparatus for wireless communication at a device including a memory and at least one processor coupled to the memory and, based at least in part on information stored in the memory, the at least one processor is configured to implement any of aspects 1 to 28.

Aspect 30 is the apparatus of aspect 29, further including a transceiver or an antenna coupled to the at least one processor.

Aspect 31 is an apparatus for wireless communication at a device including means for implementing any of aspects 1 to 28.

Aspect 32 is a computer-readable medium (e.g., a non-transitory computer-readable medium) storing computer executable code, where the code when executed by a processor causes the processor to implement any of aspects 1 to 32.

What is claimed is:

1. An apparatus for wireless communication at a first device, comprising:
   memory; and
   at least one processor coupled to the memory and, based at least in part on information stored in the memory, the at least one processor is configured to:
   transmit an indication of a first demodulation reference signal (DMRS), wherein the first DMRS is based on a non-linearity of a power amplifier of the first device and at least one of a modulation and coding scheme (MCS) used for a data transmission associated with the first DMRS or a channel type of a channel associated with the first DMRS, wherein the nonlinearity of the power amplifier is associated with a power amplification (PA) backoff magnitude based on a peak-to-average power ratio (PAPR) of the data transmission, and wherein the first DMRS is further based on a PAPR of the first DMRS; and
   transmit, for a second device, the first DMRS for channel estimation at the second device.

2. The apparatus of claim 1, wherein the at least one processor is further configured to:
   transmit, for the second device, an DMRS configuration indicating a mapping between a set of more than two MCSs and a set of more than two DMRSs, wherein each MCS in the set of more than two MCSs is mapped to one DMRS in the set of more than two DMRSs, wherein the indication of the first DMRS comprises an indication of the MCS associated with the data transmission.

3. The apparatus of claim 2, wherein the at least one processor is further configured to:
- transmit, for the second device, an update to the DMRS configuration indicating at least one of a change to a correspondence between a particular MCS in the set of more than two MCSs and a particular DMRS in the set of more than two DMRSs or an MCS to add to the set of more than two MCSs and a corresponding DMRS.

4. The apparatus of claim 2, wherein the DMRS configuration is based on a set of characteristics of the second device.

5. The apparatus of claim 2, wherein the DMRS configuration further comprises a default DMRS.

6. The apparatus of claim 1, wherein the at least one processor is further configured to:
- transmit, for the second device, an DMRS configuration indicating a plurality of mappings between a set of more than two MCSs and a set of more than two DMRSs, wherein, for each mapping in the plurality of mappings, each MCS in the set of more than two MCSs is mapped to one DMRS in the set of more than two DMRSs; and
- transmit an indication of a particular mapping in the plurality of mappings to use to identify an DMRS, wherein the indication of the first DMRS comprises an indication of the MCS associated with the data transmission.

7. The apparatus of claim 1, wherein the indication of the first DMRS comprises (1) a sequence indication indicating one of a Zadoff-Chu sequence or a Gold sequence associated with the first DMRS and (2) an MCS associated with the first DMRS.

8. The apparatus of claim 1, wherein the at least one processor is further configured to:
- receive a second indication of a second DMRS associated with a second data transmission from the second device for a channel estimation at the first device.

9. The apparatus of claim 8, wherein the second DMRS is different than the first DMRS based on one or more of the MCS associated with the data transmission from the second device, a waveform associated with the data transmission from the second device, or characteristics of a second power amplifier of the second device.

10. The apparatus of claim 1, wherein the first DMRS is configured to be used for one of an indicated time or until a time indicated by a transmission of a different DMRS.

11. The apparatus of claim 1, wherein the channel type is one or more of a delay spread dispersive channel, an additive white Gaussian noise channel (AWGN), or an additive signal-dependent Gaussian noise (ASDGN) channel.

12. The apparatus of claim 1, wherein the MCS used for the data transmission is based on one or more of a suitable data rate associated with the data transmission or a suitable reliability as indicated by a suitable bit error rate (BER) or block error rate (BLER), further comprising a transceiver or an antenna coupled to the at least one processor, wherein the at least one processor is configured to transmit the first DMRS via the transceiver or the antenna.

13. An apparatus for wireless communication at a second device, comprising:
- memory; and
- at least one processor coupled to the memory and, based at least in part on information stored in the memory, the at least one processor is configured to:
- receive an indication of a first demodulation reference signal (DMRS) associated with a first device, wherein the first DMRS is based on of a non-linearity of a power amplifier of the first device and at least one of a modulation and coding scheme (MCS) used for a data transmission associated with the first DMRS or a channel type of a channel associated with the first DMRS, wherein the non-linearity of the power amplifier is associated with a power amplification (PA) backoff magnitude based on a peak-to-average power ratio (PAPR) of the data transmission, and wherein the first DMRS is further identified based on a PAPR of the first DMRS;
- receive, from the first device, the first DMRS for channel estimation; and
- receive the data transmission associated with the first DMRS.

14. The apparatus of claim 13, wherein the at least one processor is further configured to:
- receive, from the first device, an DMRS configuration indicating a mapping between a set of more than two MCSs and a set of more than two DMRSs, wherein each MCS in the set of more than two MCSs is mapped to one DMRS in the set of more than two DMRSs, wherein the indication of the first DMRS comprises an indication of the MCS associated with the data transmission.

15. The apparatus of claim 14, wherein the at least one processor is further configured to:
- receive, from the first device, an update to the DMRS configuration indicating at least one of a change to a correspondence between a particular MCS in the set of more than two MCSs and a particular DMRS in the set of more than two DMRSs or an MCS to add to the set of more than two MCSs and a corresponding DMRS.

16. The apparatus of claim 14, wherein the DMRS configuration is based on a set of characteristics of the second device.

17. The apparatus of claim 14, wherein the DMRS configuration further comprises a default DMRS.

18. The apparatus of claim 13, wherein the at least one processor is further configured to:
- receive, from the first device, an DMRS configuration indicating a plurality of mappings between a set of more than two MCSs and a set of more than two DMRSs, wherein, for each mapping in the plurality of mappings, each MCS in the set of more than two MCSs is mapped to one DMRS in the set of more than two DMRSs; and
- receive an indication of a particular mapping in the plurality of mappings to use to identify an DMRS, wherein the indication of the first DMRS comprises an indication of the MCS associated with the data transmission.

19. The apparatus of claim 13, wherein the indication of the first DMRS comprises (1) a sequence indication indicating one of a Zadoff-Chu sequence or a Gold sequence associated with the first DMRS and (2) an MCS associated with the first DMRS.

20. The apparatus of claim 13, wherein the at least one processor is further configured to:
- transmit a second indication of a second DMRS associated with a second data transmission from the second device for the channel estimation at the first device.

21. The apparatus of claim 20, wherein the second DMRS is different than the first DMRS based on one or more of the MCS associated with the data transmission from the second device, a waveform associated with the data transmission from the second device, or characteristics of a second power amplifier of the second device.

22. The apparatus of claim 13, wherein the first DMRS is configured to be used for one of an indicated time or until a time indicated by a transmission of a different DMRS.

23. The apparatus of claim 13, wherein the channel type is one or more of a delay spread dispersive channel, an additive white Gaussian noise channel (AWGN), or an additive signal-dependent Gaussian noise (ASDGN) channel.

24. The apparatus of claim 13, wherein the MCS used for the data transmission is based on one or more of a suitable data rate associated with the data transmission or a suitable reliability as indicated by a suitable bit error rate (BER) or block error rate (BLER), further comprising a transceiver or an antenna coupled to the at least one processor, wherein the at least one processor is configured to receive the first DMRS via the transceiver or the antenna.

25. A method of wireless communication at a first device, comprising:
   transmitting an indication of a first demodulation reference signal (DMRS), wherein the first DMRS is based on of a non-linearity of a power amplifier of the first device and at least one of a modulation and coding scheme (MCS) used for a data transmission associated with the first DMRS or a channel type of a channel associated with the first DMRS, wherein the nonlinearity of the power amplifier is associated with a power amplification (PA) backoff magnitude based on a peak-to-average power ratio (PAPR) of the data transmission, and wherein the first DMRS is further based on a PAPR of the first DMRS; and
   transmitting, for a second device, the first DMRS for channel estimation at the second device.

26. A method of wireless communication at a second device, comprising:
   receiving an indication of a first demodulation reference signal (DMRS) associated with a first device, wherein the first DMRS is based on of a non-linearity of a power amplifier of the first device and at least one of a modulation and coding scheme (MCS) used for a data transmission associated with the first DMRS or a channel type of a channel associated with the first DMRS;
   receiving, from the first device, the first DMRS for channel estimation, wherein the nonlinearity of the power amplifier is associated with a power amplification (PA) backoff magnitude based on a peak-to-average power ratio (PAPR) of the data transmission, and wherein the first DMRS is further identified based on a PAPR of the first DMRS; and
   receiving the data transmission associated with the first DMRS.

* * * * *